United States Patent
Teng et al.

(10) Patent No.: US 12,479,808 B2
(45) Date of Patent: Nov. 25, 2025

(54) SALTS OR CO-CRYSTALS OF {2-[3-CYCLOHEXYL-3-(TRANS-4-PROPOXY-CYCLOHEXYL)-UREIDO]-THIAZOL-5-YLSULFANYL}-ACETIC ACID AND USES THEREOF

(71) Applicant: vTv Therapeutics LLC, High Point, NC (US)

(72) Inventors: Jing Teng, Lafayette, IN (US); Nathan E. Gignac, Lafayette, IN (US)

(73) Assignee: VTV THERAPEUTICS LLC, High Point, NC (US)

( * ) Notice: Subject to any disclaimer, the term of this patent is extended or adjusted under 35 U.S.C. 154(b) by 484 days.

(21) Appl. No.: 18/000,907

(22) PCT Filed: Jun. 7, 2021

(86) PCT No.: PCT/US2021/036084
§ 371 (c)(1),
(2) Date: Dec. 6, 2022

(87) PCT Pub. No.: WO2021/252311
PCT Pub. Date: Dec. 16, 2021

(65) Prior Publication Data
US 2023/0219909 A1    Jul. 13, 2023

Related U.S. Application Data

(60) Provisional application No. 63/035,996, filed on Jun. 8, 2020.

(51) Int. Cl.
C07D 277/54     (2006.01)
A61P 3/10       (2006.01)
C07D 295/00     (2006.01)

(52) U.S. Cl.
CPC ............. *C07D 277/54* (2013.01); *A61P 3/10* (2018.01); *C07D 295/00* (2013.01); *C07B 2200/13* (2013.01)

(58) Field of Classification Search
CPC ............ C07D 277/54; C07D 295/00; C07B 2200/13; A61P 3/10
See application file for complete search history.

(56) References Cited

U.S. PATENT DOCUMENTS

| | | | |
|---|---|---|---|
| 7,384,967 B2 | 6/2008 | Polisetti et al. |
| 7,432,287 B2 | 10/2008 | Iino et al. |
| 7,582,769 B2 | 9/2009 | Murray et al. |
| 7,598,391 B2 | 10/2009 | Murray et al. |
| 7,851,636 B2 | 12/2010 | Murray et al. |
| 7,872,139 B2 | 1/2011 | Murray et al. |
| 7,884,210 B2 | 2/2011 | Lau et al. |
| 7,897,628 B2 | 3/2011 | Polisetti et al. |
| 8,063,081 B2 | 11/2011 | Polisetti et al. |
| 8,263,634 B2 | 9/2012 | Murray et al. |
| 8,283,834 B2 | 10/2012 | Matsubara et al. |
| 8,318,778 B2 | 11/2012 | Murray et al. |
| 8,362,049 B2 | 1/2013 | Murray et al. |
| 8,586,614 B2 | 11/2013 | Lau et al. |
| RE45,670 E | 9/2015 | Polisetti et al. |
| 9,359,313 B2 | 6/2016 | Mjalli et al. |
| 9,855,251 B2 | 1/2018 | Mjalli et al. |
| 10,004,782 B2 | 6/2018 | Valcarce et al. |
| 10,064,846 B2 | 9/2018 | Mjalli et al. |
| 10,363,244 B2 | 7/2019 | Mjalli et al. |
| 10,588,943 B2 | 3/2020 | Valcarce et al. |
| 10,952,993 B2 | 3/2021 | Freeman et al. |
| 10,980,861 B2 | 4/2021 | Valcarce et al. |
| 11,833,136 B2 | 12/2023 | Freeman et al. |
| 11,974,989 B2 | 5/2024 | Freeman et al. |
| 12,391,658 B2 | 8/2025 | Diep et al. |
| 2002/0002190 A1 | 1/2002 | Corbett et al. |
| 2002/0065239 A1 | 5/2002 | Caplan et al. |
| 2002/0198200 A1 | 12/2002 | Kester et al. |
| 2003/0171411 A1 | 9/2003 | Kodra et al. |
| 2003/0220350 A1 | 11/2003 | Lau et al. |
| 2004/0014789 A1 | 1/2004 | Lau et al. |
| 2004/0014968 A1 | 1/2004 | Bizzarro et al. |
| 2006/0246141 A1 | 11/2006 | Liversidge et al. |
| 2006/0248141 A1 | 11/2006 | Mukherjee |
| 2007/0054897 A1 | 3/2007 | Murray et al. |
| 2008/0026987 A1 | 1/2008 | Mackay et al. |
| 2008/0319028 A1 | 12/2008 | Murray et al. |
| 2009/0105482 A1 | 4/2009 | Lau et al. |
| 2009/0118501 A1 | 5/2009 | Murray et al. |

(Continued)

FOREIGN PATENT DOCUMENTS

AU   2993771 A    12/1972
CA   2416229 A1   1/2002

(Continued)

OTHER PUBLICATIONS

Agiostratidou et al., Standardizing Clinically Meaningful Outcome Measures Beyond HbA1c for Type 1 Diabetes: A Consensus Report of the American Association of Clinical Endocrinologists, the American Association of Diabetes Educators, the American Diabetes Association, the Endocrine Society, JDRF International, The Leona M. and Harry B. Helmsley Charitable Trust, the Pediatric Endocrine Society, and the T1D Exchange. Diabetes Care 40:1622-1630 (2017).

Agius et al. Regulation of glycogen synthesis from glucose and gluconeogenic precursors by insulin in periportal and perivenous rat hepatocytes. Biochem J. 266:91-102 (1990).

Aicher et al. ARRY-403, A Novel Glucokinase Activator with Potent Glucose-Dependent AntiHyperglycemic Activity in Animal Models of Type 2 Diabetes Mellitus. Poster 126—Keystone Symposium: Type 2 Diabetes and Insulin Resistance (J3), Jan. 20-25, 2009, Banff, AB (Array Biopharma).

Battelino et al. Clinical Targets for Continuous Glucose Monitoring Data. Diabetes Care 42:1593-1603 (2019).

(Continued)

*Primary Examiner* — Kamal A Saeed
(74) *Attorney, Agent, or Firm* — WILSON SONSINI GOODRICH & ROSATI

(57) ABSTRACT

Sodium, piperazine, and hydrochloride salts or co-crystals of {2-[3-cyclohexyl-3-(trans-4-propoxy-cyclohexyl)-ureido]-thiazol-5-ylsulfanyl}-acetic acid ("Compound 1") are provided herein.

28 Claims, 19 Drawing Sheets

(56) References Cited

U.S. PATENT DOCUMENTS

| | | |
|---|---|---|
| 2009/0216013 A1 | 8/2009 | Murray et al. |
| 2009/0286800 A1 | 11/2009 | Cheruvallath et al. |
| 2010/0028439 A1 | 2/2010 | Jenkins et al. |
| 2010/0204288 A1 | 8/2010 | Murray et al. |
| 2011/0301158 A1 | 12/2011 | Polisetti et al. |
| 2011/0313007 A1 | 12/2011 | Mjalli et al. |
| 2012/0071404 A1 | 3/2012 | Tucker |
| 2014/0066372 A1 | 3/2014 | Valcarce Lopez et al. |
| 2015/0035900 A1 | 2/2015 | Mano |
| 2016/0015638 A1 | 1/2016 | Mo et al. |
| 2016/0015816 A1 | 1/2016 | Benjamin et al. |
| 2016/0184277 A1 | 6/2016 | Mjalli et al. |
| 2018/0311314 A1 | 11/2018 | Valcarce Lopez et al. |
| 2019/0046645 A1 | 2/2019 | Benjamin et al. |
| 2019/0328713 A1 | 10/2019 | Chen et al. |
| 2021/0169857 A1 | 6/2021 | Freeman et al. |
| 2021/0169858 A1 | 6/2021 | Freeman et al. |
| 2022/0233701 A1 | 7/2022 | Benjamin et al. |
| 2023/0106983 A1 | 4/2023 | Diep et al. |
| 2023/0219910 A1 | 7/2023 | Teng et al. |
| 2024/0245656 A1 | 7/2024 | Freeman et al. |
| 2025/0288681 A1 | 9/2025 | Benjamin et al. |

FOREIGN PATENT DOCUMENTS

| | | |
|---|---|---|
| CA | 2724116 A1 | 11/2009 |
| EP | 0129408 A2 | 12/1984 |
| EP | 0432040 A1 | 6/1991 |
| EP | 0499299 A2 | 8/1992 |
| EP | 0885890 A1 | 12/1998 |
| EP | 0979823 A1 | 2/2000 |
| EP | 1125922 A1 | 8/2001 |
| EP | 1211246 A1 | 6/2002 |
| EP | 2392575 A1 | 12/2011 |
| GB | 771147 A | 3/1957 |
| GB | 1185540 A | 3/1970 |
| GB | 1195672 A | 6/1970 |
| GB | 1260386 A | 1/1972 |
| GB | 1282308 A | 7/1972 |
| GB | 1318291 A | 5/1973 |
| WO | WO-0017165 A1 | 3/2000 |
| WO | WO-0026203 A1 | 5/2000 |
| WO | WO-0045742 A1 | 8/2000 |
| WO | WO-0053591 A1 | 9/2000 |
| WO | WO-0058293 A2 | 10/2000 |
| WO | WO-0100206 A1 | 1/2001 |
| WO | WO-0144216 A1 | 6/2001 |
| WO | WO-0144217 A1 | 6/2001 |
| WO | WO-0157008 A1 | 8/2001 |
| WO | WO-0183465 A2 | 11/2001 |
| WO | WO-0183478 A2 | 11/2001 |
| WO | WO-0185706 A1 | 11/2001 |
| WO | WO-0185707 A1 | 11/2001 |
| WO | WO-0208209 A1 | 1/2002 |
| WO | WO-0214311 A2 | 2/2002 |
| WO | WO-0246173 A1 | 6/2002 |
| WO | WO-02070494 A1 | 9/2002 |
| WO | WO-03055482 A1 | 7/2003 |
| WO | WO-03070727 A1 | 8/2003 |
| WO | WO-2004002481 A1 | 1/2004 |
| WO | WO-2004085388 A2 | 10/2004 |
| WO | WO-2005066145 A1 | 7/2005 |
| WO | WO-2005086145 A1 | 9/2005 |
| WO | WO-2005103050 A2 | 11/2005 |
| WO | WO-2005123132 A2 | 12/2005 |
| WO | WO-2007006760 A1 | 1/2007 |
| WO | WO-2007006814 A1 | 1/2007 |
| WO | WO-2008079787 A2 | 7/2008 |
| WO | WO-2008084043 A1 | 7/2008 |
| WO | WO-2008084044 A1 | 7/2008 |
| WO | WO-2011149945 A1 | 12/2011 |
| WO | WO-2013173417 A2 | 11/2013 |
| WO | WO-2014137797 A2 | 9/2014 |
| WO | WO-2014137799 A1 | 9/2014 |
| WO | WO-2019241089 A1 | 12/2019 |
| WO | WO-2021167840 A1 | 8/2021 |
| WO | WO-2021252309 A1 | 12/2021 |
| WO | WO-2021252311 A1 | 12/2021 |

OTHER PUBLICATIONS

Berge et al. Pharmaceutical Salts. Journal of Pharmaceutical Sciences 66(1):1-19 (Jan. 1977).

Bonadonna et al. Piragliatin (RO4389620), a Novel Glucokinase Activator, Lowers Plasma Glucose Both in the Postabsorptive State and after a Glucose Challenge in Patients with Type 2 Diabetes Mellitus: A Mechanistic Study. J Clin Endocrinol Metab, 95(11):1-9 (2010).

Buse et al. Simplici-T1 First Clinical Trial to Test Activation of Glucokinase as an Adjunctive Treatment for Type 1 Diabetes. Diabetes 67 (Supplement_1): 126-LB (Abstract) (Mar. 2018).

Buse et al. Simplici-T1: First Clinical Trial to Test Activation of Glucokinase as an Adjunctive Treatment for Type 1 Diabetes Poster presented at the 78th Scientific Session of ADA in Orlando, FL, Jun. 22-26, 2018.

Buse et al. The Simplici-TI Trial: Glucokinase activator (GKA) TTP399 improves glycemic control in patients with type 1 diabetes (T1D) Poster presented at the 80th Scientific Session of ADA, Jun. 12-16, 2020.

Castelhano et al., Glucokinase-activating ureas. Bioorg Med Chem Lett 15:1501-1504 (2005).

Chipkin et al., Joslin's Diabetes, pp. 97-115 (1994).

ClinicalTrials.gov—Clinical Trials Identifier NCT01247363 (2011).

Colowick., The Hexokinases. The Enzymes 9:1-48 (1973).

Drucker et al. Sitagliptin.Nat Rev Drug Discov 6:109-110 (2007).

Eiki et al. Pharmacokinetic and Pharmacodynamic Properties of the Glucokinase Activator MK-0941 in Rodent Models of Type 2 Diabetes and Healthy Dogs. Mol Pharmacol 80:1156-1165 (2011).

Ericsson et al. The glucokinase activator AZD6370 decreases fasting and postprandial glucose in type 2 diabetes mellitus patients with effects influenced by dosing regimen and food. Diabetes Research and Clinical Practice 98:436-444 (2012).

Evans et al., Design of potent, orally effective, nonpeptidal antagonists of the peptide hormone cholecystokinin. PNAS USA 83(13):4918-4922 (1986 ).

Ferre et al., Evidence from transgenic mice that glucokinase is rate limiting for glucose utilization in the liver. The Faseb Journal 10:1213-1218 (1996).

Freeman et al. Mechanism matters: preliminary evidence that activation of glucokinase by TTP399 does not increase plasma or urine ketones in type 1 diabetes, P51, presented at the 56th European Association for the Study of Diabetes Conference—Virtual, Sep. 22, 2020.

Gardner., Studies in the Polyoxyphenol Series: Iii. Syntheses of Substituted Phenylureas From Methylated and Ethylated Vanillin. Canadian Journal Research 26:681-693 (1948).

Garg et al. Effects of Sotagliflozin Added to Insulin in Patients with Type 1 Diabetes. N Engl J Med 377:2337-48 (2017).

Girard et al., Mechanisms by which carbohydrates regulate expression of genes for glycolytic and lipogenic enzymes. Annu Rev Nutr 17:325-352 (1997).

Glaser et al., Familial hyperinsulinism caused by an activating glucokinase mutation. N Engl J Med 338:226-230 (1998).

Guidance for Industry, Estimating the Maximum Safe Starting Does in Initial Clinical Trials for Therapeutics in Adult Healthy Volunteers, FDA. Jul. 2005 activity in animal modest of type 2 diabetes mellitus. Diabetologia 52(Suppl):S342 (2009).

Heitmeier et al., Hydroxyphenethylamino Derivatives of Various Nitrogen Heterocycles. J Med Chem 7(3):288-293 (1964).

Hinklin et al. ARRY-403, a glucokinase activator with potent glucose-dependent anti-hyperglycaemic activity in animal models of type 2 diabetes mellitus. Diabetologia 52(Supp):S342 (2009).

Johnson et al. Glucose-dependent modulation of insulin secretion and intracellular calcium ions by GKA50, a glucokinase activator. Diabetes 56:1694-1702 (2007).

Kos et al., New treatments for type 2 diabetes. J.R.Coll. Physicians Edinb. 39(3):227-230 (2009).

(56) References Cited

OTHER PUBLICATIONS

Li et al. The Effect of the Physical States of Binders on High-Shear Wet Granulation and Granule Properties: A Mechanistic Approach Toward Understanding High-Shear Wet Granulation Process. Part II. Granulation and Granule Properties. J Pharm Sci 100:294-310 (2011).
Liang et al., Variable effects of maturity-onset-diabetes-of-youth (MODY)-associated glucokinase mutations on substrate interactions and stability of the enzyme. Biochem Journal 309:167-173 (1995).
Lin et al. Development of potential novel cushioning agents for the compaction of coated multi-particulates by co-processing micronized lactose with polymers. Eur J Pharm Biopharm 79(2):406-179:406-415 (2011).
Lindstrom. The Physiology of Obese-Hyperglycemic Mice [ob/ob Mice] Scientific World Journal 7:666-685 (2007).
Lu et al. Characterization of a Novel Glucokinase Activator in Rat and Mouse Models. PLOS One 9(2):88431 (2014).
Mann. The Influence of Obesity on Health. N Engl J Med 291:226-232 (1974).
Mathieu et al. Glucose Variable in Type 1 Diabetes Studies With Dapagliflozin: Pooled Analysis of Continuous Glucose Monitoring Data From DEPICT-1 and 2, Diabetes Care 42:1081-1087 and supplementary data (2019).
Matschinsky et al. Glucokinase activators for diabetes therapy: May 2010 status report. Diabetes Care 34(Suppl 2):S236-S243 (2011).
Matschinsky et al. Research and Development of Glucokinase Activators for Diabetes Therapy: Theoretical and Practical Aspects. Handb Exp Pharmacol 203:357-401 (2011).
Matschinsky. GKAs for diabetes therapy: why no clinically useful drug after two decades of trying? Trends Pharmacol Sci 34(2):90-9 (2013).
McCarty. In type 1 diabetics, high-dose biotin may compensate for low hepatic insulin exposure, promoting a more normal expression of glycolytic and gluconeogenic enzymes and thereby aiding glycemic control. Medical Hypotheses 95:45-8 (2016).
McVean et al., Combination Therapy of ARRY-403 with Metformin. Sitagliptin or Pioglitazone Results in Additive Glucose Lowering In Female ZDF Rats, Poster 104—Keystone Symposium! Type 2 Diabetes and Insulin Resistance (J3), Jan. 20-25, 2009, Banff, AB (Array Biopharma).
Meglasson et al., New perspectives on pancreatic islet glucokinase. Am J Physiol 246:E1-E13 (1984).
Migoya et al. The Glucokinase (GK) Activator MK-0599 Lowers Plasma Glucose Concentrations in Healthy Non-Diabetic Subjects. Diabetologia 52:S344-S344 Abstract (2009).
Mylari et al., Design and Synthesis af a Novel Family of Triazine-Based Inhibitors of Sorbitol Dehydrogenase With Oral Activity: 1-{4-[3r,5s-Dimethyl-4-(4-Methyl-[1,3,5]Triazin-2-YI)-Piperazin-1-YI]-[1,3,5]Triazin-2-YI)—(R) Ethanol. Bioorgan Med Chem 11:4179-4188 (2003).
Nakamura et al. Control of beta cell function and proliferation in mice stimulated by small-molecule glucokinase activator under various conditions. Diabetologia 55(5):1745-1754 (2012).
Nathan et al. Medical Management of Hyperglycemia in Type 2 Diabetes: A Consensus Algorithm for the Initiation and Adjustment of Therapy. Diabetes Care 32:193-203 (2009).
Newton. Chapter 12: Drug Release from Capsules. Phamaceutical Capsules, Pharmaceutical Press, Podczeck et al. Eds. 2nd Ed. (pp. 213-237) (2004).
Pal et al. Recent advances in glucokinase activators for the treatment of type 2 diabetes. Drug Discovery Today 14(15/16):784-792 (2009).
Patani et al. Bioisosterism: A Rational Approach in Drug Design. Chem. Rev. 96:3147-3176 (1996).
PCT/US2021/017743 International Search Report and Written Opinion dated Apr. 21, 2021.
PCT/US2021/036082 International Search Report and Written Opinion dated Sep. 8, 2021.
PCT/US2021/036084 International Search Report and Written Opinion dated Sep. 9, 2021.
Pfefferkom. Strategies for the design of hepaloselective glucokinase activators to treat type 2 diabetes. Expert Opin. Drug Discov. 8(3):319-330 (2013).
Pfuetzner et al. Intensive insulin therapy with insulin lispro in patients with type 1 diabetes reduces the frequency of hypoglycemic episodes. Exp Clin Endocrinol Diabetes 104(1):25-30 (abstract) (1996).
Polakof. Diabetes Therapy: Novel Patents Targeting the Glucose-Induced Insulin Secretion. Recent Pat DNA Gene Seq 4(1):1-9 (2010).
Printz et al. Mammalian glucokinase. Ann Rev Nutr 13:463-496 (1993).
Priyadarsini et al. Glucokinase Activators: A Glucose Sensor Role in Pancreatic Islets and Hepatocyte. International Journal of Pharmacy and Pharmaceutical Sciences 4(2):81-87 (2012).
Purchase et al., Tetrazole-Substituted Ureas as Inhibitors of Acyl-Coa:Cholesterol O-Acyltransferase (Acat) a Novel Preparation of Ureas From Weakly Nucleophilic Amines. Biorgan Med Chem Lett 6(15):1753-1758 (1996).
Ripsin et al., Management of Blood Glucose in Type 2 Diabetes Mellitus. American Family Physician 79:29-36 (Jan. 2009).
Rosenstock et al. Empagliflozin as Adjunctive to Insulin Therapy in Type 1 Diabetes: The EASE Trials. Diabetes Care 41:2560-9 (2018).
Sands et al. Sotagliflozin, a Dual SGLT1 and SGLT2 Inhibitor, as Adjunct Therapy to Insulin in Type 1 Diabetes. Diabetes Care 38(7):1181-1188 (2015).
Sands et al. Sotagliflozin, a Dual SGLT1 and SGLT2 Inhibitor, as Adjunct Therapy to Insulin in Type 1 Diabetes. Diabetes Care 38(7):1181-1188 (Supplementary Data) (2015).
Valcarce, C., et al., The Simplici-T1 trial: Activation of glucokinase by TTP399 improves glycemic control in patients with T1DM, P50, presented at the 56th European Association for the Study of Diabetes Conference—Virtual, Sep. 22, 2020.
Valcarce et al. TTP399, A Liver Selective Glucokinase Activator Increases Efficacy of Currently Marketed Therapies for Type 2 Diabetes. Jun. 2015. ADA 75th Scientific Sessions, Boston (Abstract 1271-P).
Valcarce et al. TTP399, a Liver-Selective Glucose Kinase Activator (GKA), Lowers Glucose and Does Not Increase Lipids in Subjects with Type 2 Diabetes Mellitus (T2DM). Jun. 2014. ADA 74th Scientific Sessions. (Abstract 122-OR).
Valcarce et al. Results from the sentinel and learning phase of the Simplici-T1 study, thefirst clinical trial to test activation of glucokinase as an adjunctive treatment for type 1 diabetes. Presented at the 55th EASD conference, Sep. 18, 2019, Barcelona, Spain.
Valcarce et al. The Simplici-T1 Trial: Relationship Between Glycemic Control and Insulin Dose Poster presented at the 80th Scientific Session of ADA, Jun. 12-16, 2020.
Valcarce et al. TTP399, A Liver Selective Glucokinase Activator (GKA) the Preserves the Physiological Regulation of Glucokinase (GK) by GK Regulatory Protein (GKRP). Jun. 2015. ADA 75th Scientific Sessions, Boston (Poster 1168-P).
Valcarce et al. TTP399, A Liver Selective Glucokinase Activator (GKA) the Preserves the Physiological Regulation of Glucokinase (GK) by OK Regulatory Protein (GKRP). Jun. 2015. ADA 75th Scientific Sessions. Boston (Abstract 1168-P).
Valcarce et al. TTP399. A Liver Selective Glucokinase Activator Increases Efficacy of Currently Marketed Therapies for Type 2 Diabetes. Jun. 2015. ADA 75th Scientific Sessions: Boston (Poster 1271-P).
Valcarce et al. TTP399, a Liver-Selective Glucose Kinase Activator (GKA), Lowers Glucose and Does NOT Increase Lipids in Subjects with Type 2 Diabetes Mellitus (T2DM). Jun. 2014. ADA 74th Scientific Sessions. (Power Point 122-OR).
Valcarce et al. TTP399, a Novel, Liver Selective Glucokinase Activator: Results from a 10 day Pilot Study in Patients with type 2 Diabetes Mellitus *(T2DM) Naive to Drug, Poster presented at the 76th Scientific Sessions of the American Diabetes Association in New Orleans, LA, Jun. 11-13, 2016.

(56) References Cited

OTHER PUBLICATIONS

Valcarce. Selective Activation of Glucokinase (GK) in the Liver: Improves Glycemic Control and Reduces Insulin Need as Well as Risk of Ketoacidosis in Type 1 Diabetic Minipigs, presented at the Keystone Symposia on Diabetes, Jan. 22-26, 2017, Keystone, Colorado.

Valcarce. The Importance of Tissue Selectivity and Preservation of the Physiological Regulation when Targeting Key Metabolic Regulators as Glucokinase, Poster presented at the Keystone Conference in La Jolla, CA, Apr. 17-20, 2016.

Vella et al. Abstract TTP399: A liver-selective and Therapeutically Viable Glucokinase Activator . . . Study presented at the 17th Annual Rachmiel Levine-Arthur Riggs Diabetes Research Symposium, Endocrine Society ENDO2017 Conference, Orlando, Florida, Mar. 27-Apr. 4, 2017.

Vella et al. Targeting hepatic glucokinase to treat diabetes with TTP399, a hepatoselective glucokinase activator. Sci Transl Med. 11(475):eaau3441 (2019).

Vella et al., TTP399: A liver-selective and Therapeutically Viable Glucokinase Activator. Results from a 6-Month Phase 2 Study presented at the 17th Annual Rachmiel Levine-Arthur Riggs Diabetes Research Symposium, Endocrine Society ENDO2017 Conference, Orlando, Florida, Mar. 27-Apr. 4, 2017.

Brittain, H.G., et al. Polymorphism in Pharmaceutical Solids. Marcel Dekker, Inc., 192(1-10):183-226 (1999).

Meininger, Gary E. et al. Effects of MK-0941, a novel glucokinase activator, on glycemic control in insulin-treated patients with type 2 diabetes. Diabetes Care 34(12):2560-2566 (2011).

Yu, Lian. et al. Physical characterization of polymorphic drugs: an integrated characterization strategy. PSTT 1(3):118-127 (1998).

Bhattacharya et al. Chapter 9: Thermoanalytical and Crystallographic Methods. Polymorphism in pharmaceutical solids. pp. 318-346 (2018).

Brittain. Polymorphism and Solvatomorphism J Pharm Sci 98(5):1617-1642 (2009).

Gabriely et al. Fructose normalizes specific counterregulatory responses to hypoglycemia in patients with type 1 diabetes. Diabetes 54(3):609-616 (2005).

Morisette et al. High-throughput crystallization: polymorphs, slats, co-crystals, and solvates of pharmaceutical solids. Advanced Drug Delivery Reviews 56:275-300 (2004).

Morral et al. Adenovirus-mediated expression of glucokinase in the liver as an adjuvant treatment for type 1 diabetes. Hum Gene Ther 12(13):1561-1570 (2002).

Anderson, Bradley D et al. Chapter 34: Preparation of water-soluble organic compounds by salt formation. Latest Drug Discovery Chemistry 2:347-365 (1999).

Bastin, Richard J et al. Salt Selection and Optimisation Procedures for Pharmaceutical New Chemical Entities. Organic Process Research and Development 4(5):427-435 (2000).

Braga, Dario et al. Crystal polymorphism and multiple crystal forms. Structure and Bonding 132:25-50 (2009).

Caira, Mino R. Crystalline Polymorphism of Organic Compounds. In: Design of Organic Solids, Topics in Current Chemistry. Springer 198:163-208 (1998).

Donnelly, L.A et al., Frequency and predictors of hypoglycaemia in Type 1 and insulin- treated Type 2 diabetes: a population-based study. Diabet Med 22(6):749-755 (2005).

Hilfiker, Rolf, et al. Relevance of Solid-State Properties for Pharmaceutical Products. In: Polymorphism: In the Pharmaceutical Industry. Wiley: 1-19 (2006).

Kumar, Challa V, and Anita Chaudhari. Proteins Immobilized at the Galleries of Layered a- Zirconium Phosphate: Structure and Activity Studies. Journal of the American Chemical Society 122(5):830-837 (2000).

Terada, Katsuhide. Application of Thermal Analysis to the Pharmaceutical Development. Netsu Sokutei 38(2):46-53 (2010).

Yamano, Mitsuhisa. Approach to Crystal Polymorph in Process Research of New Drug. Journal of Synthetic Organic Chemistry Japan 65(9):907-913 (2007).

Yoshinori, Nakai, and Manabu Hanano. New Pharmaceutical Science. Nanzando Co., Ltd :1-26 (1984).

Co-pending U.S. Appl. No. 19/271,551, inventors DIEP; Nhut et al., filed on Jul. 16, 2025.

Gao, Bowei et al. Multi-component non-fullerene acceptors with tunable bandgap structures for efficient organic solar cells. Journal of Materials Chemistry 6(46):23644-23649 (2018).

SALTS OR CO-CRYSTALS OF {2-[3-CYCLOHEXYL-3-(TRANS-4-PROPOXY-CYCLOHEXYL)-UREIDO]-THIAZOL-5-YLSULFANYL}-ACETIC ACID AND USES THEREOF

FIELD OF THE INVENTION

The disclosure relates to: a) salts or co-crystals of {2-[3-cyclohexyl-3-(trans-4-propoxy-cyclohexyl)-ureido]-thiazol-5-ylsulfanyl}-acetic acid ("Compound 1" or "API"); b) crystalline forms of the salts or co-crystals of Compound 1; c) pharmaceutical compositions comprising one or more salts or co-crystals of Compound 1, and, optionally a pharmaceutically acceptable carrier; and d) methods of treating a type of diabetes mellitus and other disorders by administering one or more salts or co-crystals of Compound 1 to a patient in need thereof.

BACKGROUND

Glucokinase ("GK") is a key regulator of glucose homeostasis and acts as the physiological glucose sensor, changing its conformation, activity, and/or intracellular location in parallel with changes in glucose concentrations. GK has two main distinctive characteristics that make it a good choice for blood glucose control. First, its expression is mostly limited to tissues that require glucose-sensing (mainly liver and pancreatic (3-cells). Second, GK is able to sense changes in serum glucose levels and modulate changes in liver glucose metabolism that in turn regulate the balance between hepatic glucose production (HGP) and glucose consumption, and to modulate changes in insulin secretion by the beta-cells. The concept of GK activation for the treatment of diabetes is attractive because it has proven to be effective and safe in normalizing glycemia in animal models of type 1 and type 2 diabetes by a mechanism entirely distinct from the action of antidiabetic therapies currently on the market.

Although multiple small-molecule activators of GK have been in clinical development, their initial therapeutic promise has been hampered by the occurrence of hypoglycemia, increased triglycerides (TG) concentrations, and loss of efficacy over time. These adverse events (AEs) were related to ongoing 13 cell activation.

Compound 1 is an oral, small molecule, liver selective glucokinase activator that improves glycemic control and may not induce hypoglycemia, dyslipidemia, or pathological increases of glycogen and TG in the liver at therapeutically relevant doses. Compound 1 does not cause similar adversarial effects. (Vella et al., Science Translational Medicine 16 Jan. 2019).

Not all compounds that are GK activators have characteristics affording the best potential to become useful therapeutics. Some of these characteristics include high affinity at the GK, duration of GK deactivation, oral bioavailability, tissue distribution, and stability (e.g., ability to formulate or crystallize, shelf life). Favorable characteristics can lead to improved safety, tolerability, efficacy, therapeutic index, patient compliance, cost efficiency, manufacturing ease, etc.

In addition, salts or co-crystals of a given compound can differ from each other with respect to one or more physical properties, such as solubility and dissociation, true density, melting point, crystal shape, compaction behavior, flow properties, and/or solid state stability. These differences affect practical parameters such as storage stability, compressibility and density (important in formulation and product manufacturing), and dissolution rates (an important factor in determining bio-availability). Although U.S. Pat. No. 7,598,391 discloses Compound 1 as a free acid, there is a need for additional drug forms that are useful for activating GK activity in vitro and in vivo, and have properties suitable for large-scale manufacturing and formulation. Provided herein are new salt or co-crystal forms of Compound 1 methods of treating diabetes mellitus by using new salt or co-crystal forms of Compound 1.

BRIEF SUMMARY

In one aspect, the disclosure provides a salt or co-crystal of Compound 1. In one aspect, the disclosure provides a crystalline form of the salt or co-crystal of Compound 1. In one aspect, the salt or co-crystal of Compound 1 is anhydrous, a hydrate, or a solvate.

In one aspect, the disclosure provides a salt or co-crystal comprising
component (a) which is {2-[3-cyclohexyl-3-(trans-4-propoxy-cyclohexyl)-ureido]-thiazol-5-ylsulfanyl}-acetic acid of Formula (I)

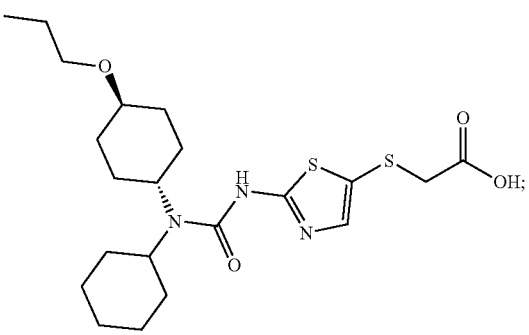

and
component (b) selected from the group consisting of sodium, piperazine, and hydrochloride.

In one aspect, the disclosure provides that component (b) of the salt or co-crystal is sodium. In one aspect, the disclosure provides that the molar ratio of component (a) and component (b) sodium of the salt or co-crystal is about 1:1.

In one aspect, the sodium salt of Compound 1 is a crystalline form characterized by an XRPD pattern having peaks at 4.4±0.2, 9.4±0.2, and 20.0±0.2 degrees two theta.

In one aspect, the crystalline form of the sodium salt is characterized by a TGA profile substantially as shown in FIG. 2.

In one aspect, the crystalline form of the sodium salt is characterized by a DSC profile substantially as shown in FIG. 3.

In one aspect, the crystalline form of the sodium salt is characterized by an IR pattern having peaks at 1358.3±2.0, 1606.1±2.0, and 1649.0±2.0 cm$^{-1}$.

In one aspect, the crystalline form of the sodium salt is Form A.

In one aspect, the crystalline form of the sodium salt is substantially free of other polymorphic forms. In one aspect, the crystalline form of the sodium salt has a polymorphic purity of at least 90%. In one aspect, the crystalline form of the sodium salt has a polymorphic purity of at least 99%.

In one aspect, the disclosure provides that component (b) of the salt or co-crystal is piperazine.

In one aspect, the disclosure provides that the molar ratio of component (a) and component (b) piperazine is about 2:1.

In one aspect, the piperazine salt or co-crystal of Compound 1 is in a crystalline form selected from the group consisting of:
 a) a crystalline form characterized by an XRPD pattern having peaks at 4.9±0.2, 12.5±0.2, and 14.9±0.2 degrees two theta;
 b) a crystalline form characterized by an XRPD pattern having peaks at 5.1±0.2, 13.6±0.2, and 20.5±0.2 degrees two theta; and
 c) a crystalline form characterized by an XRPD pattern having peaks at 5.5±0.2, 16.7±0.2, and 19.9±0.2 degrees two theta.

In one aspect, the crystalline form of the piperazine salt or co-crystal is characterized by an XRPD pattern having peaks at 4.9±0.2, 12.5±0.2, and 14.9±0.2 two theta.

In one aspect, the crystalline form of the piperazine salt or co-crystal is characterized by a TGA profile substantially as shown in FIG. 6.

In one aspect, the crystalline form of the piperazine salt or co-crystal is characterized by an endothermic peak with onset at about 226° C., as determined by DSC.

In one aspect, the crystalline form of the piperazine salt or co-crystal is characterized by a $^{13}C$ NMR substantially as shown in FIG. 8.

In one aspect, the crystalline form of the piperazine salt or co-crystal is a hydrate.

In one aspect, the crystalline form of the piperazine salt or co-crystal is Form B.

In one aspect, the crystalline form of the piperazine salt or co-crystal is characterized by an XRPD pattern having peaks at 5.1±0.2, 13.6±0.2, and 20.5±0.2 degrees two theta.

In one aspect, the crystalline form of the piperazine salt or co-crystal is characterized by a TGA profile substantially as shown in FIG. 10.

In one aspect, the crystalline form of the piperazine salt or co-crystal is characterized by a DSC profile substantially as shown in FIG. 11.

In one aspect, the crystalline form of the piperazine salt or co-crystal is Form C.

In one aspect, the crystalline form of the piperazine salt or co-crystal is characterized by an XRPD pattern having peaks at 5.5±0.2, 16.7±0.2, and 19.9±0.2 degrees two theta.

In one aspect, the crystalline form of the piperazine salt or co-crystal is Form D.

In one aspect, the disclosure provides the molar ratio of component (a) and component (b) piperazine is about 1:1.

In one aspect, the piperazine salt or co-crystal of Compound 1 is in a crystalline form characterized by an XRPD pattern having peaks at 4.9±0.2, 12.5±0.2, and 18.3±0.2 degrees two theta In one aspect, the crystalline form of the piperazine salt or co-crystal is characterized by a TGA profile substantially as shown in FIG. 14.

In one aspect, the crystalline form of the piperazine salt or co-crystal is characterized by a DSC profile substantially as shown in FIG. 15.

In one aspect, the crystalline form of the piperazine salt or co-crystal is Form E.

In one aspect, the crystalline form of the piperazine salt or co-crystal is substantially free of other polymorphic forms. In one aspect, the crystalline form of the piperazine salt or co-crystal has a polymorphic purity of at least 90%. In one aspect, the crystalline form of the piperazine salt or co-crystal has a polymorphic purity of at least 99%.

In one aspect, the disclosure provides that component (b) of the salt or co-crystal is hydrochloride. In one aspect, the disclosure provides that the molar ratio of component (a) and component (b) hydrochloride of the salt or co-crystal is about 1:1.

In one aspect, the hydrochloride salt of Compound 1 is a crystalline form characterized by an XRPD pattern having peaks at 4.6±0.2, 7.2°±0.2, and 17.7°±0.2 degrees degrees two theta.

In one aspect, the crystalline form of the hydrochloride salt is characterized by a TGA profile substantially as shown in FIG. 17.

In one aspect, the crystalline form of the hydrochloride salt is characterized by a DSC profile substantially as shown in FIG. 18.

In one aspect, the crystalline form of the hydrochloride salt is characterized by an IR pattern having peaks at 1119.0±2.0, 1540.2±2.0, and 1667.5±2.0 $cm^{-1}$.

In one aspect, the crystalline form of the hydrochloride salt is Form F.

In one aspect, the crystalline form of the hydrochloride salt is substantially free of other polymorphic forms. In one aspect, the crystalline form of the hydrochloride salt has a polymorphic purity of at least 90%. In one aspect, the crystalline form of the hydrochloride salt has a polymorphic purity of at least 99%.

In one aspect, the disclosure provides a pharmaceutical composition comprising one or more salts or co-crystals of Compound 1 disclosed herein and a pharmaceutically acceptable carrier, diluent, excipient, or a mixture thereof.

In one aspect, the disclosure provides a method of treating a type of diabetes mellitus or other disorders, wherein the method comprises administering a pharmaceutical composition disclosed herein to a patient in need thereof. In some aspects, the type of diabetes is type 1 diabetes mellitus. In some aspects, the type of diabetes is type 2 diabetes mellitus.

In one aspect, the pharmaceutical composition is administered orally. In one aspect, the pharmaceutical composition is administered as a tablet.

In one aspect, the patient is administered up to about 2000 mg of {2-[3-cyclohexyl-3-(trans-4-propoxy-cyclohexyl)-ureido]-thiazol-5-ylsulfanyl}-acetic acid daily.

In one aspect, the present disclosure provides methods of making one or more salts or co-crystals of Compound 1 disclosed herein.

In one aspect, the disclosure provides a use of a pharmaceutical composition disclosed herein for the manufacture of a medicament for treating a type of diabetes mellitus or other disorders. In one aspect, the use is for treating type 1 diabetes mellitus. In one aspect, the use is for treating type 2 diabetes mellitus.

In one aspect, the disclosure provides a pharmaceutical composition disclosed herein for use in a method for treating a type of diabetes mellitus or other disorders. In one aspect, the use is for treating type 1 diabetes mellitus. In one aspect, the use is for treating type 2 diabetes mellitus.

DETAILED DESCRIPTION

I. Definitions

Figure 1:
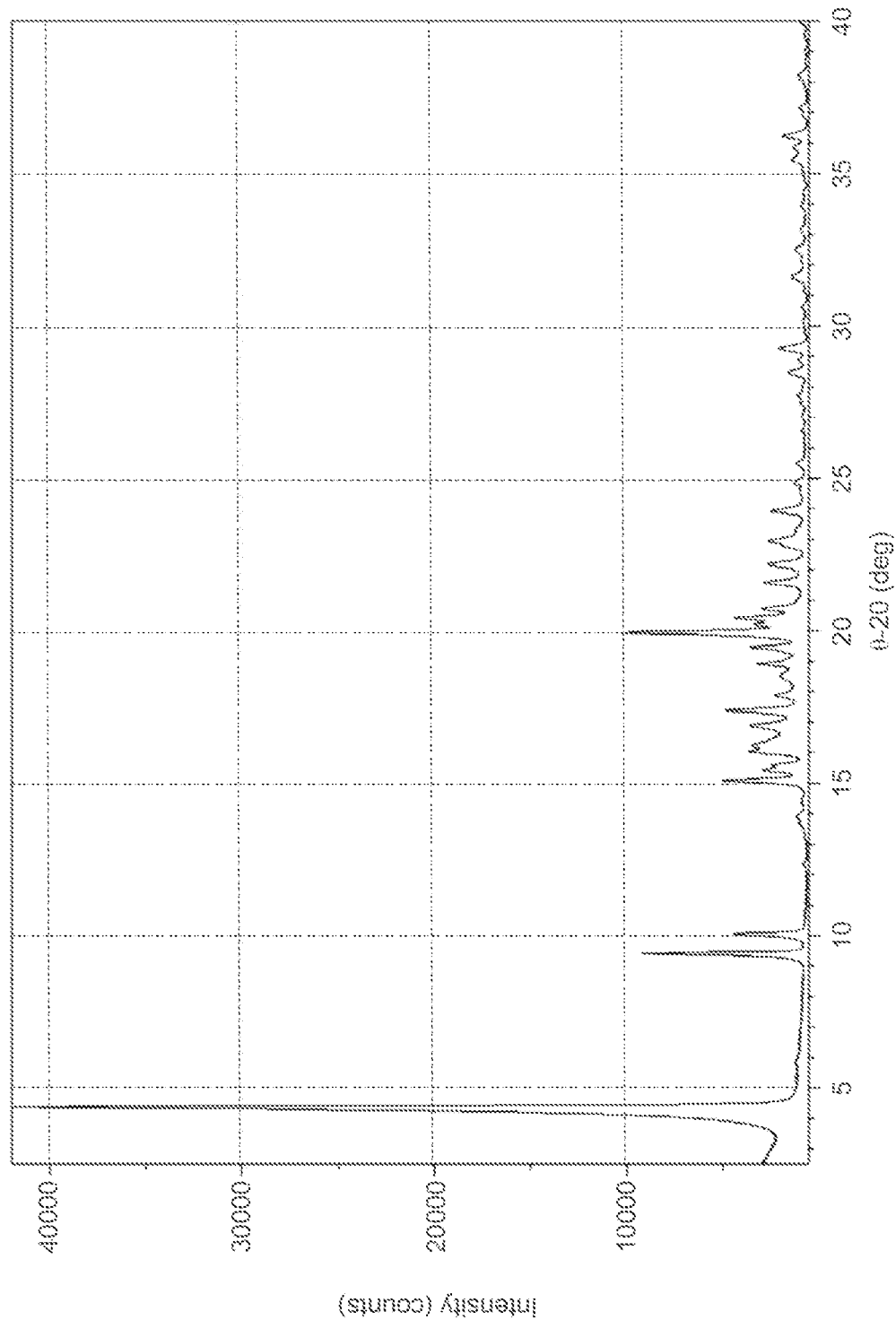
FIG. 1 is a powder X-ray diffraction pattern ("XRPD") corresponding to Form A, a sodium salt of Compound 1.

To facilitate understanding of the disclosure set forth herein, a number of terms are defined below.

Generally, the nomenclature used herein and the laboratory procedures in organic chemistry, medicinal chemistry, and pharmacology described herein are those well-known and commonly employed in the art. Unless defined otherwise, all technical and scientific terms used herein generally have the same meaning as commonly understood by one of ordinary skill in the art to which this disclosure belongs.

In this specification and the appended claims, the singular forms "a," "an" and "the" include plural referents unless the context clearly dictates otherwise. The terms "a" (or "an"), as well as the terms "one or more," and "at least one" can be used interchangeably herein. In certain aspects, the term "a" or "an" means "single." In other aspects, the term "a" or "an" includes "two or more" or "multiple."

Furthermore, "and/or" where used herein is to be taken as specific disclosure of each of the two specified features or components with or without the other. Thus, the term "and/or" as used in a phrase such as "A and/or B" herein is intended to include "A and B," "A or B," "A" (alone), and "B" (alone). Likewise, the term "and/or" as used in a phrase such as "A, B, and/or C" is intended to encompass each of the following aspects: A, B, and C; A, B, or C; A or C; A or B; B or C; A and C; A and B; B and C; A (alone); B (alone); and C (alone).

The term "Compound 1" refers to the compound of {2-[3-cyclohexyl-3-(trans-4-propoxy-cyclohexyl)-ureido]-thiazol-5-ylsulfanyl}-acetic acid.

The term "subject" refers to an animal, including, but not limited to, a primate (e.g., human), cow, sheep, goat, horse, dog, cat, rabbit, rat, or mouse. The terms "subject" and "patient" are used interchangeably herein in reference, for example, to a mammalian subject, such as a human subject.

The terms "treat," "treating," and "treatment" are meant to include alleviating or abrogating a disorder, disease, or condition, or one or more of the symptoms associated with the disorder, disease, or condition; or alleviating or eradicating the cause(s) of the disorder, disease, or condition itself.

The term "therapeutically effective amount" is meant to include the amount of a compound that, when administered, is sufficient to prevent development of, or alleviate to some extent, one or more of the symptoms of a disorder, disease, or condition being treated. The term "therapeutically effective amount" also refers to the amount of a compound that is sufficient to elicit the biological or medical response of a cell, tissue, system, animal, or human, which is being sought by a researcher, veterinarian, medical doctor, or clinician.

The terms "pharmaceutically acceptable carrier," "pharmaceutically acceptable excipient," "pharmaceutically acceptable diluent," refer to a pharmaceutically-acceptable material, composition, or vehicle, such as a liquid or solid filler, diluent, excipient, solvent, or encapsulating material. In one embodiment, each component is "pharmaceutically acceptable" in the sense of being compatible with the other ingredients of a pharmaceutical formulation, and suitable for use in contact with the tissue or organ of humans and animals without excessive toxicity, irritation, allergic response, immunogenicity, or other problems or complications, commensurate with a reasonable benefit/risk ratio. See *Remington: The Science and Practice of Pharmacy,* 21st Edition, Lippincott Williams & Wilkins: Philadelphia, PA, 2005; *Handbook of Pharmaceutical Excipients,* 5th Edition, Rowe et al., Eds., The Pharmaceutical Press and the American Pharmaceutical Association: 2005; and *Handbook of Pharmaceutical Additives,* 3rd Edition, Ash and Ash Eds., Gower Publishing Company: 2007; Pharmaceutical Preformulation and Formulation, Gibson Ed., CRC Press LLC: Boca Raton, FL, 2004 (incorporated herein by reference).

The term "co-crystal" means a molecular complex of a compound disclosed herein and one or more non-ionized co-crystal formers connected via non-covalent interactions. In one aspect, the co-crystals disclosed herein can include a non-ionized form of Compound 1 (e.g., Compound 1 free acid) and one or more non-ionized co-crystal formers, where non-ionized Compound 1 and the co-crystal former(s) are connected through non-covalent interactions. In one aspect, co-crystals disclosed herein can include an ionized form of Compound 1 (e.g., a salt of Compound 1) and one or more non-ionized co-crystals formers, where ionized Compound 1 and the co-crystal former(s) are connected through non-covalent interactions. Co-crystals can additionally be present in anhydrous, solvated or hydrated forms. In certain instances, co-crystals can have improved properties as compared to the parent form (i.e., the free molecule, zwitterion, etc.) or a salt of the parent compound. Improved properties can be increased solubility, increased dissolution, increased bioavailability, increased dose response, decreased hygroscopicity, a crystalline form of a normally amorphous compound, a crystalline form of a difficult to salt or unsaltable compound, decreased form diversity, more desired morphology, and the like.

The term "co-crystal former" or "co-former" refers to the bases or acids disclosed herein in association with Compound 1, or any other compound disclosed herein.

The terms "about" or "approximately" means an acceptable error for a particular value as determined by one of ordinary skill in the art, which depends in part on how the value is measured or determined. In certain embodiments, the term "about" or "approximately" means within 1, 2, 3, or 4 standard deviations. In certain embodiments, the term "about" or "approximately" means within 50%, 20%, 15%, 10%, 9%, 8%, 7%, 6%, 5%, 4%, 3%, 2%, 1%, 0.5%, or 0.05% of a given value or range.

The terms "active ingredient" and "active substance" refer to a compound, which is administered, alone or in combination with one or more pharmaceutically acceptable excipients, to a subject for treating, delaying onset of, or ameliorating one or more symptoms of a condition, disorder, or disease. As used herein, "active ingredient" and "active substance" can be an optically active isomer of a compound described herein.

The term "solvate" refers to a compound provided herein or a salt thereof, which further includes a stoichiometric or non-stoichiometric amount of solvent bound by non-covalent intermolecular forces. Where the solvent is water, the solvate is a hydrate. Where the solvent includes ethanol, the compound can be an ethanol solvate.

The term "polymorph" as used herein refers to a crystalline form of a compound or a salt, hydrate, or solvate thereof, in a particular crystal packing arrangement. All polymorphs have the same elemental composition. The term "crystalline," as used herein, refers to a solid state form which consists of orderly arrangement of structural units. Different crystalline forms of the same compound, or a salt, hydrate, or solvate thereof, arise from different packing of the molecules in the solid state, which results in different crystal symmetries and/or unit cell parameter. Different crystalline forms usually have different X-ray diffraction patterns, infrared spectra, melting points, density, hardness, crystal shape, optical and electrical properties, stability, and solubility. See, e.g., *Remington's Pharmaceutical Sciences*, 18th ed., Mack Publishing, Easton Pa., 173 (1990); *The United States Pharmacopeia*, 23rd ed., 1843-1844 (1995) (incorporated herein by reference).

Crystalline forms are most commonly characterized by X-ray powder diffraction (XRPD). An XRPD pattern of reflections (peaks, typically expressed in degrees 2-theta) is commonly considered a fingerprint of a particular crystalline form. The relative intensities of the XRPD peaks can widely vary depending on, inter alia, the sample preparation technique, crystal size distribution, filters, the sample mounting procedure, and the particular instrument employed. In some instances, new peaks can be observed or existing peaks can disappear, depending on the type of instrument or the settings. In some instances, any particular peak in an XRPD pattern can appear as a singlet, doublet, triplet, quartet, or multiplet, depending on the type of instrument or the settings, the sensitivity of the instrument, measuring conditions, and/or purity of the crystalline form. In some instances, any particular peak in an XRPD can appear in a symmetric shape or in an asymmetric shape, e.g., having a shoulder. Moreover, instrument variation and other factors can affect the 2-theta values. A skilled artisan understanding these variations is capable of discriminating or ascertaining the defining features or characteristics of a particular crystal form using XRPD, as well as using other known physicochemical techniques.

The term "anhydrate" as applied to a compound refers to a solid state wherein the compound contains no structural water within the crystal lattice.

Unless the context requires otherwise, the terms "comprise," "comprises," and "comprising" are used on the basis and clear understanding that they are to be interpreted inclusively, rather than exclusively, and that Applicant intends each of those words to be so interpreted in construing this patent, including the claims below.

For all embodiments disclosed herein, a peak positional reproducibility is associated with the values of degree-2θ (XRPD), ppm ($^{13}$C solid state NMR), and cm$^{-1}$ (IR). Accordingly, it will be understood that all peaks disclosed herein have the value disclosed±the peak positional reproducibility associated with each analytical technique. The XRPD peak positional reproducibility is ±0.2 expressed in degree-2θ. The $^{13}$C NMR peak positional reproducibility is ±0.2 ppm. The IR peak positional reproducibility is ±2 cm$^{-1}$.

Unless defined otherwise, all technical and scientific terms used herein have the same meaning as commonly understood by one of ordinary skill in the art to which this disclosure belongs. In case of conflict, the present application including the definitions will control. Unless otherwise required by context, singular terms shall include pluralities and plural terms shall include the singular. All publications, patents and other references mentioned herein are incorporated by reference in their entireties for all purposes as if each individual publication or patent application were specifically and individually indicated to be incorporated by reference.

II. Salts or Co-Crystals

In one aspect, the disclosure provides a salt or co-crystal of Compound 1.

In one aspect, the salt or co-crystal of Compound 1 is in a crystalline form. In one aspect, the salt or co-crystal of Compound 1 is anhydrous, a hydrate, or a solvate. Hydrates include, for example, a hemihydrate, monohydrate, dihydrate, trihydrate, quadrahydrate, pentahydrate, and sesquihydrate.

In one aspect, the salt or co-crystal of Compound 1 comprises
component (a) which is {2-[3-cyclohexyl-3-(trans-4-propoxy-cyclohexyl)-ureido]-thiazol-5-ylsulfanyl}-acetic acid of Formula (I)

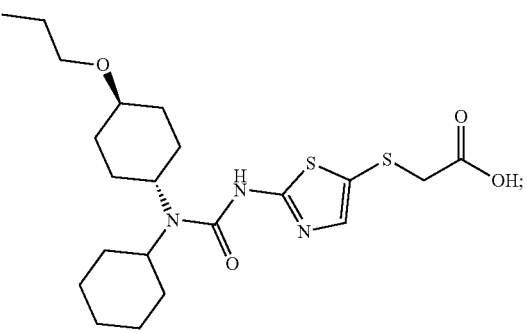

and
component (b) selected from the group consisting of sodium, piperazine, and hydrochloride.

In one aspect, the disclosure provides that component (b) of the salt or co-crystal is sodium. In one aspect, the disclosure provides that the molar ratio of component (a) and component (b) sodium of the salt or co-crystal is about 1:1.

In one aspect, the disclosure provides that component (b) of the salt or co-crystal is piperazine. In one aspect, the disclosure provides that the molar ratio of component (a) and component (b) piperazine is about 2:1 or about 1:1.

In one aspect, the disclosure provides that component (b) of the salt or co-crystal is hydrochloride. In one aspect, the disclosure provides that the molar ratio of component (a) and component (b) hydrochloride is about 1:1.

III. Crystalline Forms of Salts or Co-Crystals

A. Compound 1 Sodium Salt

In one aspect, the sodium salt of Compound 1 is a crystalline form that has a molar ratio of Compound 1 and sodium about 1:1.

In one aspect, the sodium salt of Compound 1 is crystalline and is characterized by an XRPD pattern having peaks at 4.4±0.2, 9.4±0.2, and 20.0±0.2 degrees two theta. In one aspect, the sodium salt of Compound 1 is crystalline and is characterized by an XRPD pattern having peaks at 4.4±0.2, 9.4±0.2, 10.1±0.2, 15.1±0.2, 17.4±0.2, and 20.0±0.2 degrees two theta. In one aspect, the sodium salt of Compound 1 is crystalline and is characterized by an XRPD pattern substantially as shown in FIG. 1.

Figure 2:
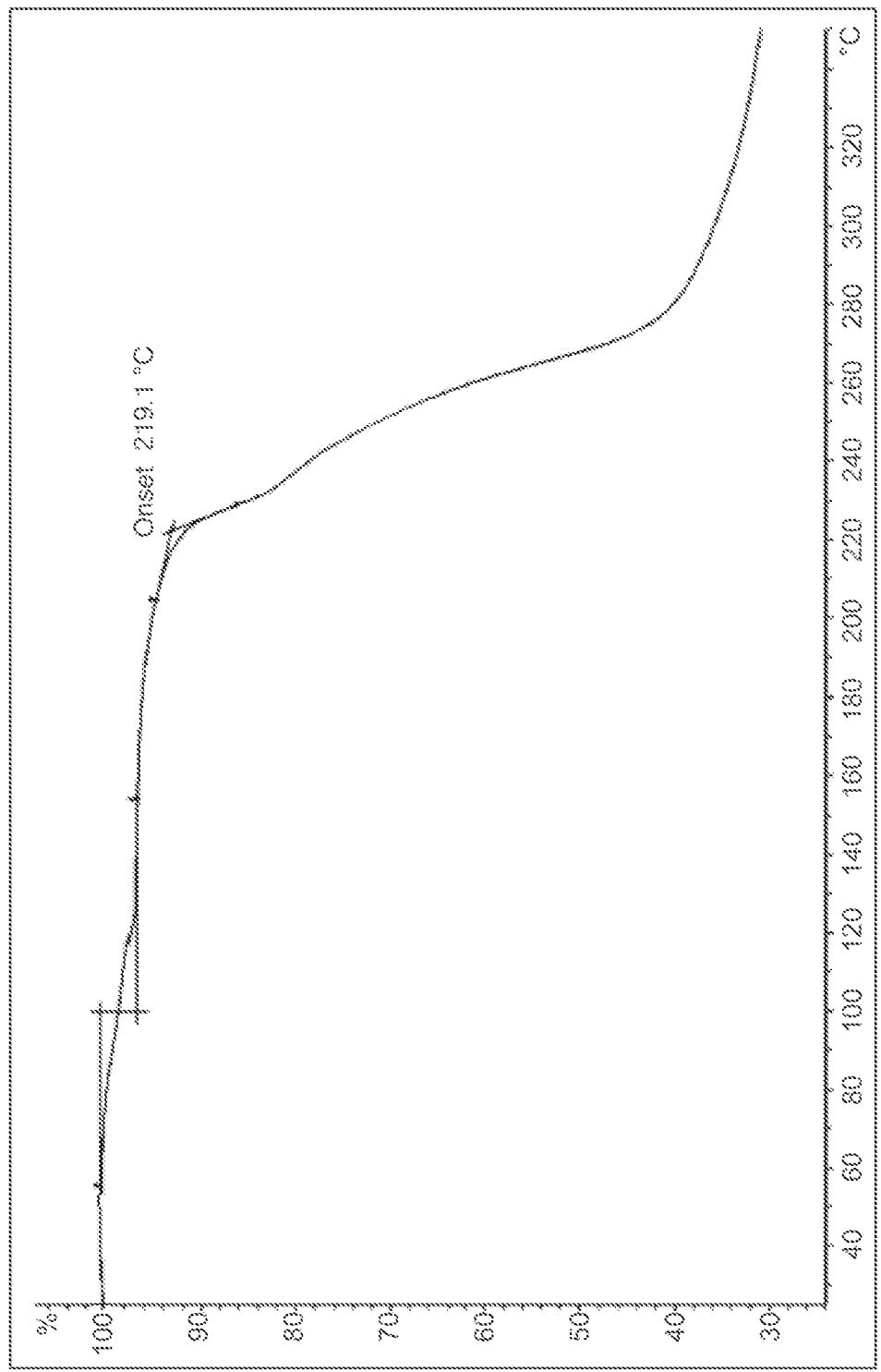
FIG. 2 is a thermogravimetric analysis thermogram ("TGA") corresponding to Form A, a sodium salt of Compound 1.

In one aspect, the sodium salt of Compound 1 is crystalline and has a TGA profile showing a weight loss of about 3.6 wt % between about 50° C. and about 150° C. In one aspect, the sodium salt of Compound 1 is crystalline and is characterized by a TGA profile substantially as shown in FIG. 2.

Figure 3:
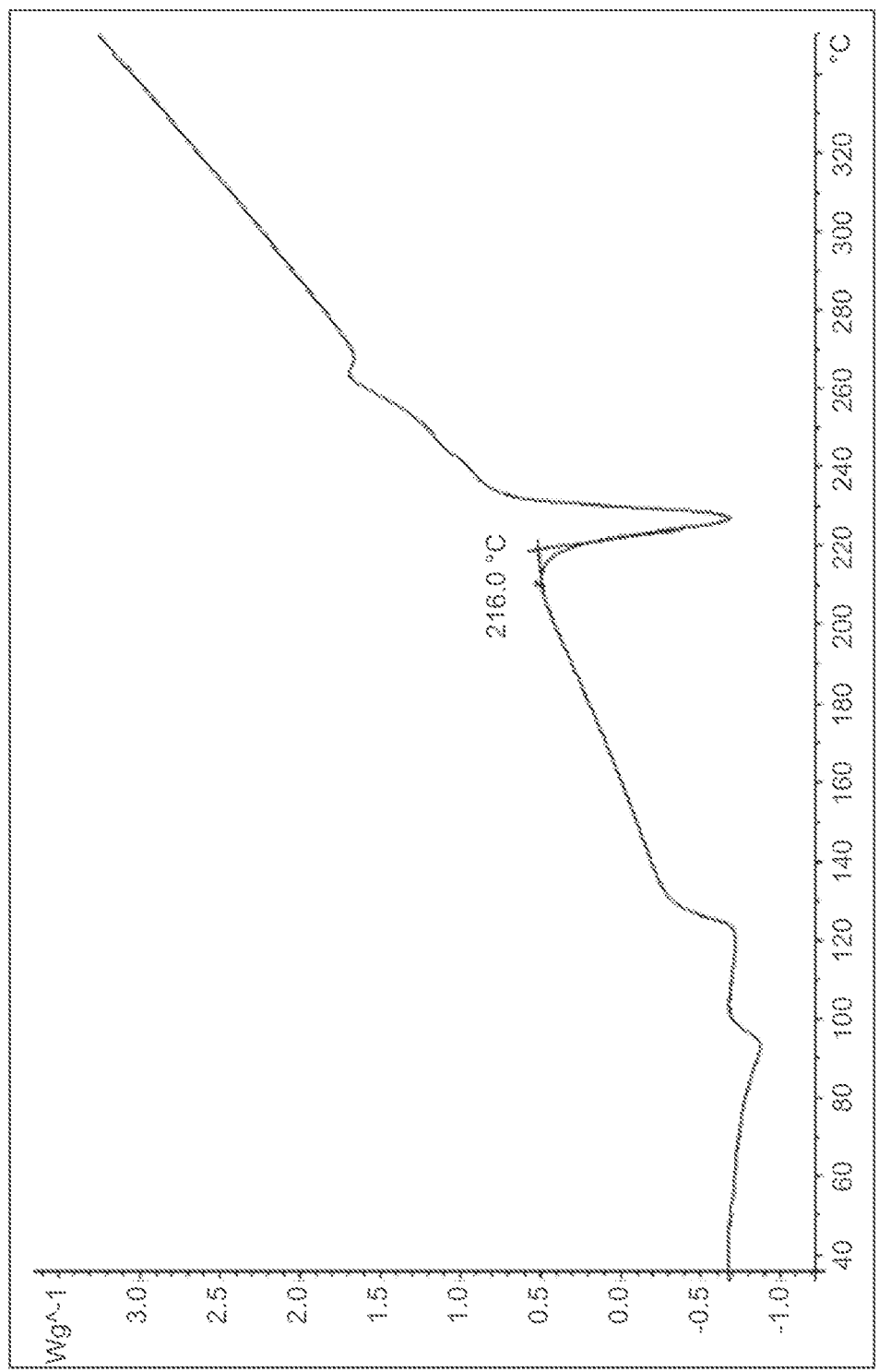
FIG. 3 is a differential scanning calorimetry thermogram ("DSC") corresponding to Form A, a sodium salt of Compound 1.

In one aspect, the sodium salt of Compound 1 is crystalline and is characterized by an endothermic peak with onset at 216° C.±2° C., as determined by DSC. In one aspect, the sodium salt of Compound 1 is crystalline and is by a DSC profile substantially as shown in FIG. 3.

In one aspect, the sodium salt of Compound 1 is crystalline and is characterized by the following XRPD pattern in Table 1 expressed in terms of the degree 2θ and relative intensities:

TABLE 1

| Angle (Degree 2θ) | Relative Intensity* (%) |
|---|---|
| 4.4 ± 0.2 | 100 |
| 9.4 ± 0.2 | 21 |
| 10.1 ± 0.2 | 11 |
| 12.34 ± 0.2 | 2 |
| 13.9 ± 0.2 | 3 |
| 15.1 ± 0.2 | 12 |
| 15.4 ± 0.2 | 7 |
| 15.6 ± 0.2 | 6 |
| 16.0 ± 0.2 | 9 |
| 16.2 ± 0.2 | 8 |
| 16.9 ± 0.2 | 9 |
| 17.4 ± 0.2 | 12 |
| 17.9 ± 0.2 | 6 |
| 18.5 ± 0.2 | 5 |
| 18.9 ± 0.2 | 8 |
| 19.5 ± 0.2 | 8 |
| 19.9 ± 0.2 | 24 |
| 20.2 ± 0.2 | 8 |
| 20.4 ± 0.2 | 11 |
| 20.7 ± 0.2 | 7 |
| 21.6 ± 0.2 | 7 |
| 22.2 ± 0.2 | 6 |
| 23.0 ± 0.2 | 6 |

TABLE 1-continued

| Angle (Degree 2θ) | Relative Intensity* (%) |
|---|---|
| 23.9 ± 0.2 | 6 |
| 24.9 ± 0.2 | 3 |
| 25.5 ± 0.2 | 3 |
| 26.6 ± 0.2 | 2 |
| 27.1 ± 0.2 | 2 |
| 27.5 ± 0.2 | 2 |
| 27.7 ± 0.2 | 3 |
| 28.5 ± 0.2 | 4 |
| 28.9 ± 0.2 | 3 |
| 29.3 ± 0.2 | 5 |

*The relative intensities can change depending on the crystal size and morphology.

In one aspect, the sodium salt of Compound 1 is crystalline and is characterized by an IR pattern having peaks at 1358.3±2.0, 1606.1±2.0, and 1649.0±2.0 $cm^{-1}$. In one aspect, the sodium salt of Compound 1 is crystalline and is characterized by an IR pattern having peaks at 1307.4±2.0, 1358.3±2.0, 1606.1±2.0, and 1649.0±2.0 $cm^{-1}$. In one aspect, the sodium salt of Compound 1 is crystalline and is characterized by the following IR peaks in Table 2.

TABLE 2

| Position ($cm^{-1}$) | Log (1/R) |
|---|---|
| 715.0 | 0.0116 |
| 788.8 | 0.0079 |
| 805.7 | 0.0061 |
| 914.0 | 0.0086 |
| 1008.8 | 0.0148 |
| 1042.8 | 0.0185 |
| 1114.0 | 0.0148 |
| 1145.0 | 0.0080 |
| 1183.6 | 0.0068 |
| 1238.1 | 0.0128 |
| 1264.3 | 0.0083 |
| 1307.4 | 0.0240 |
| 1358.3 | 0.0241 |
| 1391.2 | 0.0126 |
| 1450.9 | 0.0086 |
| 1541.1 | 0.0144 |
| 1606.1 | 0.0237 |
| 1649.0 | 0.0210 |
| 2856.0 | 0.0062 |
| 2930.2 | 0.0085 |
| 3213.5 | 0.0035 |
| 3391.8 | 0.0036 |

Figure 4:
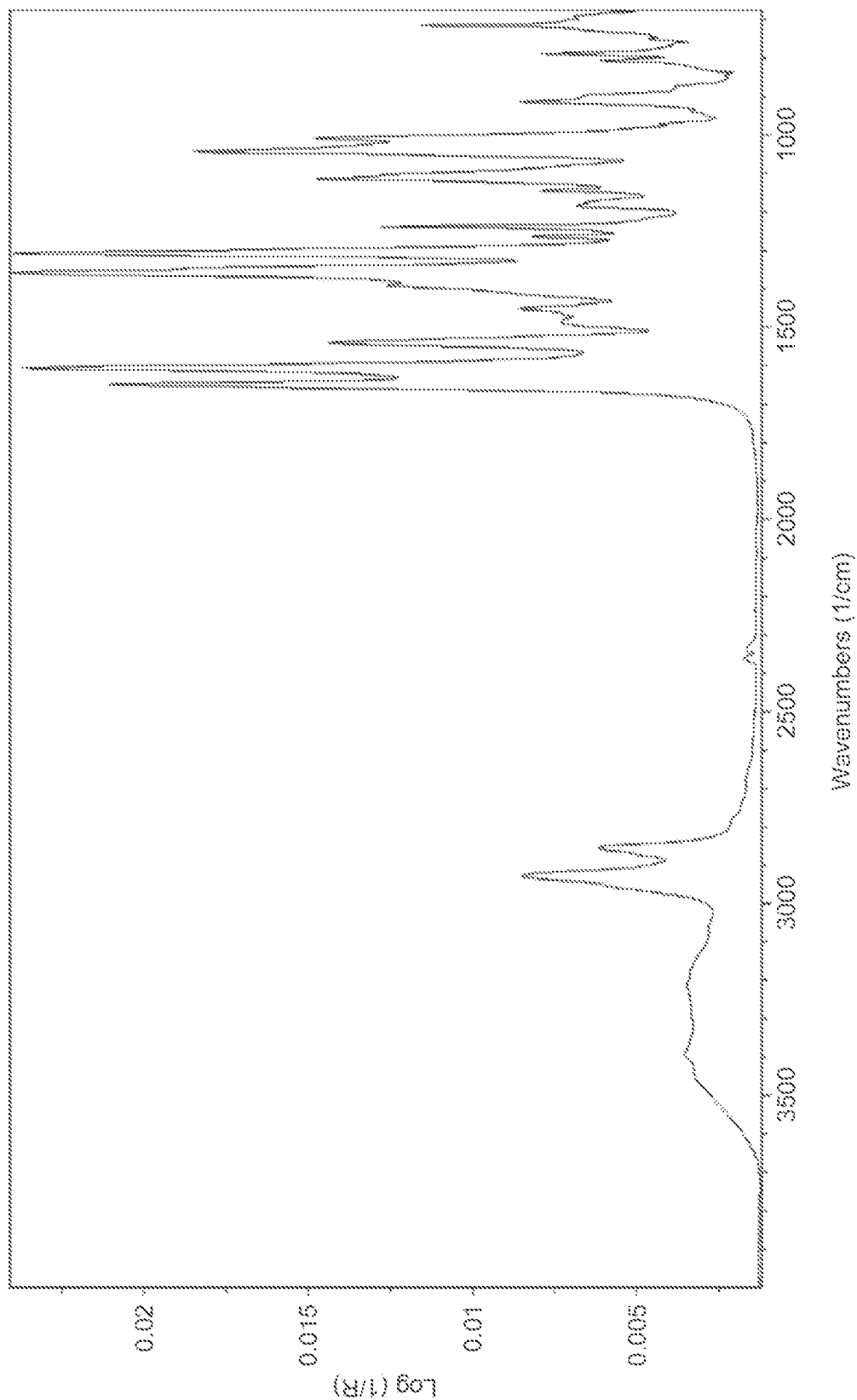
FIG. 4 is an Infrared spectrum ("IR") of Form A, a sodium salt of Compound 1.

In one aspect, the sodium salt of Compound 1 is crystalline and is characterized by an IR pattern substantially as shown in FIG. 4.

In one aspect, the sodium salt of Compound 1 is crystalline and is characterized by at least two of the following features (I-i)-(I-iv):

(I-i) an XRPD pattern having peaks at 4.4±0.2, 9.4±0.2, and 20.0±0.2 degrees two theta;
(I-ii) a TGA profile as shown in FIG. 2;
(I-iii) a DSC profile as shown in FIG. 3; or
(I-iv) an IR pattern having peaks as listed in Table 2.

In one aspect, the sodium salt of Compound 1 is crystalline and has aqueous solubility greater than 38 mg/mL.

In one aspect, the sodium salt of Compound 1 is crystalline and is Form A.

In one aspect, the sodium salt of Compound 1 is crystalline and is substantially free of other polymorphic forms. In one aspect, the sodium salt of Compound 1 is crystalline and has a polymorphic purity of at least 80%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99%.

B. Compound 1 Piperazine Salts or Co-Crystals

In one aspect, the piperazine salt or co-crystal of Compound 1 is a crystalline form that has a molar ratio of Compound 1 and piperazine about 2:1.

In one aspect, the piperazine salt or co-crystal of Compound 1 is in a crystalline form selected from the group consisting of:
a) a crystalline form characterized by an XRPD pattern having peaks at 4.9±0.2, 12.5±0.2, and 14.9±0.2 degrees two theta;
b) a crystalline form characterized by an XRPD pattern having peaks at 5.1±0.2, 13.6±0.2, and 20.5±0.2 degrees two theta; and
c) a crystalline form characterized by an XRPD pattern having peaks at 5.5±0.2, 16.7±0.2, and 19.9±0.2 degrees two theta.

Figure 5:
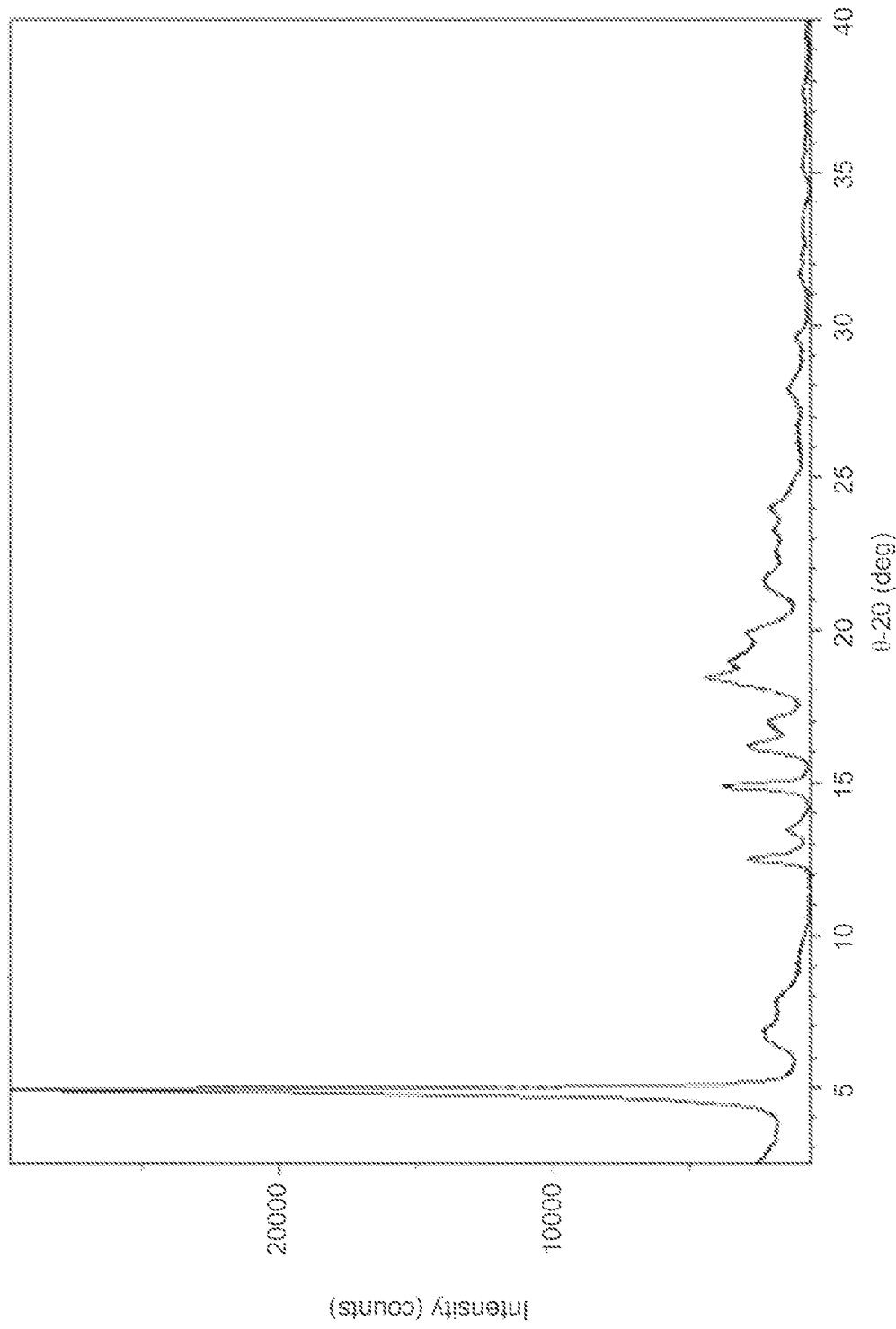
FIG. 5 is an XRPD corresponding to Form B, a piperazine salt or co-crystal of Compound 1.

In one aspect, the piperazine salt or co-crystal of Compound 1 is crystalline and is characterized by an XRPD pattern having peaks at 4.9±0.2, 12.5±0.2, and 14.9±0.2 degrees two theta. In one aspect, the piperazine salt or co-crystal of Compound 1 is crystalline and is characterized by an XRPD pattern having peaks at 4.9±0.2, 12.5±0.2, 14.9±0.2, and 16.2±0.2 degrees two theta. In one aspect, the piperazine salt or co-crystal of Compound 1 is crystalline and is characterized by an XRPD pattern substantially as shown in FIG. 5.

Figure 6:
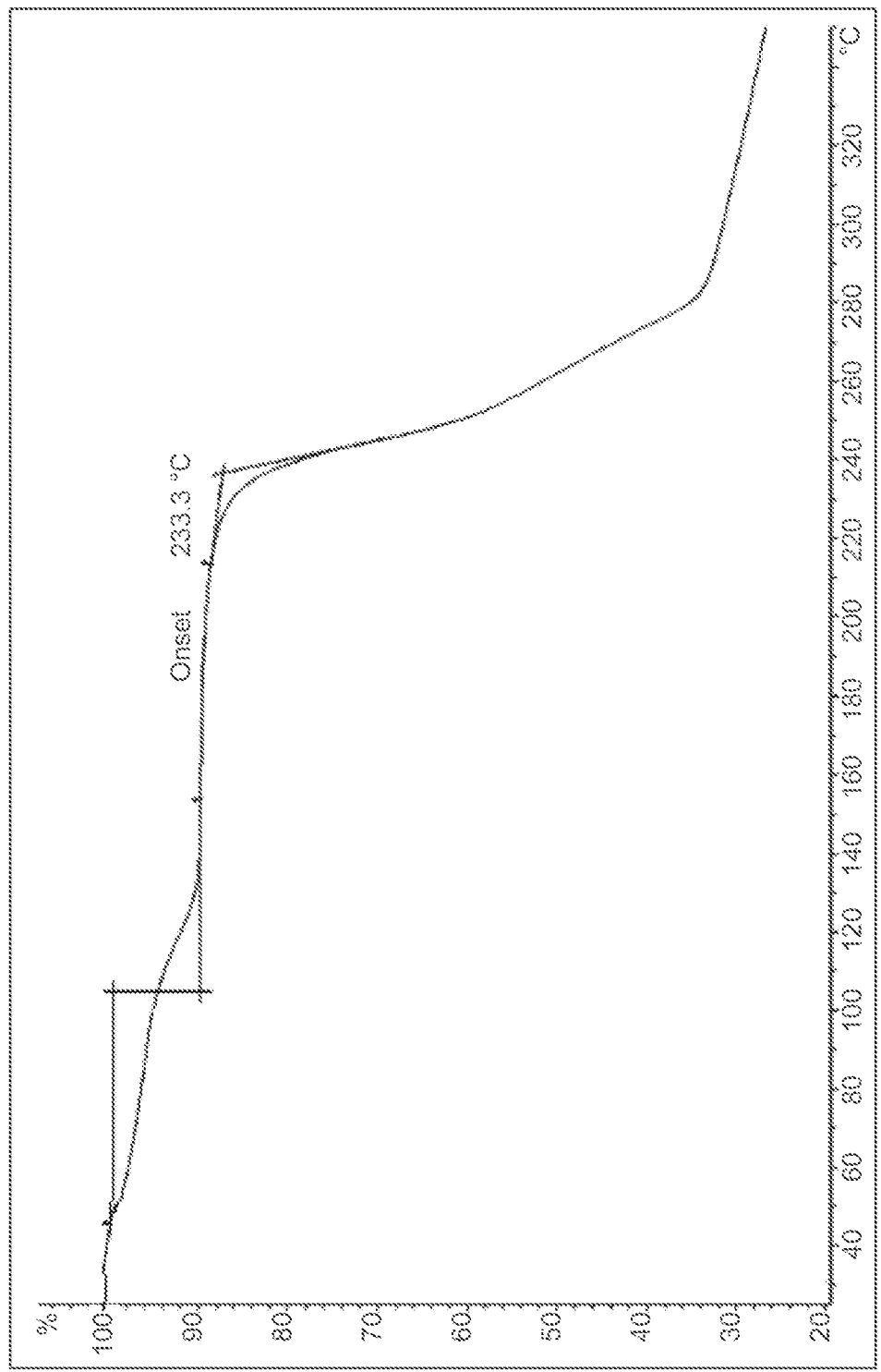
FIG. 6 is a TGA corresponding to Form B, a piperazine salt or co-crystal of Compound 1.

In one aspect, the piperazine salt or co-crystal of Compound 1 is crystalline and has a TGA profile showing about 9.5% weight loss between about 40° C. and about 150° C. In one aspect, the piperazine salt or co-crystal of Compound 1 is crystalline and is characterized by a TGA profile substantially as shown in FIG. 6.

Figure 7:
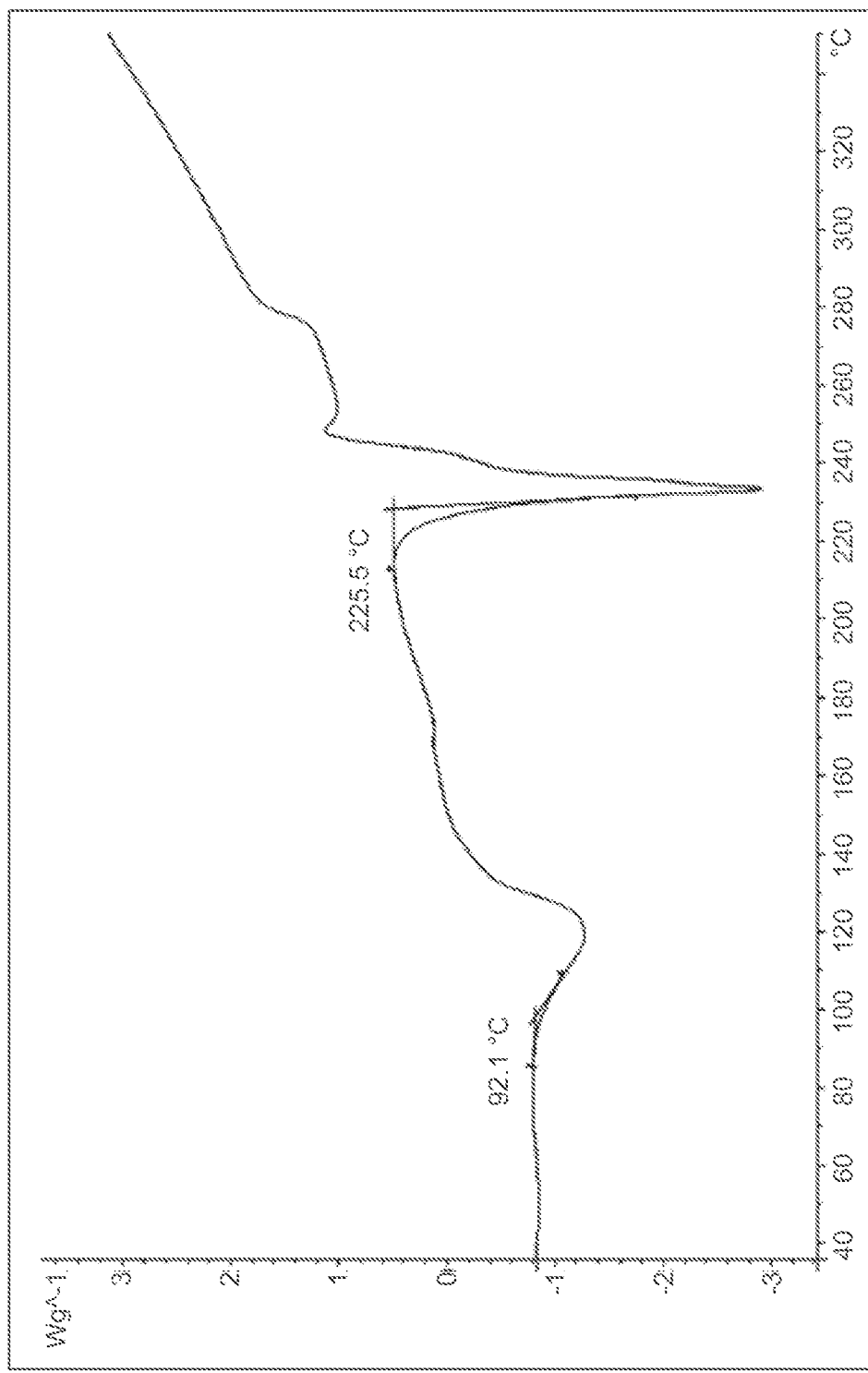
FIG. 7 is a DSC corresponding to Form B, a piperazine salt or co-crystal of Compound 1.

In one aspect, the piperazine salt or co-crystal of Compound 1 is crystalline and is characterized by an endothermic peak with onset at about 226° C., as determined by DSC. In one aspect, the piperazine salt or co-crystal of Compound 1 is crystalline and is characterized by a DSC profile substantially as shown in FIG. 7.

In one aspect, the piperazine salt or co-crystal of Compound 1 is crystalline and is characterized by the following XRPD pattern in Table 3 expressed in terms of the degree 2θ and relative intensities:

TABLE 3

| Angle (Degree 2θ) | Relative Intensity* (%) |
| --- | --- |
| 4.9 ± 0.20 | 100 |
| 6.8 ± 0.20 | 8 |
| 7.8 ± 0.20 | 6 |
| 12.5 ± 0.20 | 10 |
| 13.5 ± 0.20 | 5 |
| 14.9 ± 0.20 | 13 |
| 16.2 ± 0.20 | 10 |
| 17.0 ± 0.20 | 7 |
| 18.4 ± 0.20 | 15 |
| 19.0 ± 0.20 | 12 |
| 19.9 ± 0.20 | 10 |
| 21.6 ± 0.20 | 8 |
| 23.3 ± 0.20 | 7 |
| 24.0 ± 0.20 | 7 |
| 28.0 ± 0.20 | 5 |
| 29.6 ± 0.20 | 4 |

*The relative intensities can change depending on the crystal size and morphology.

Figure 8:
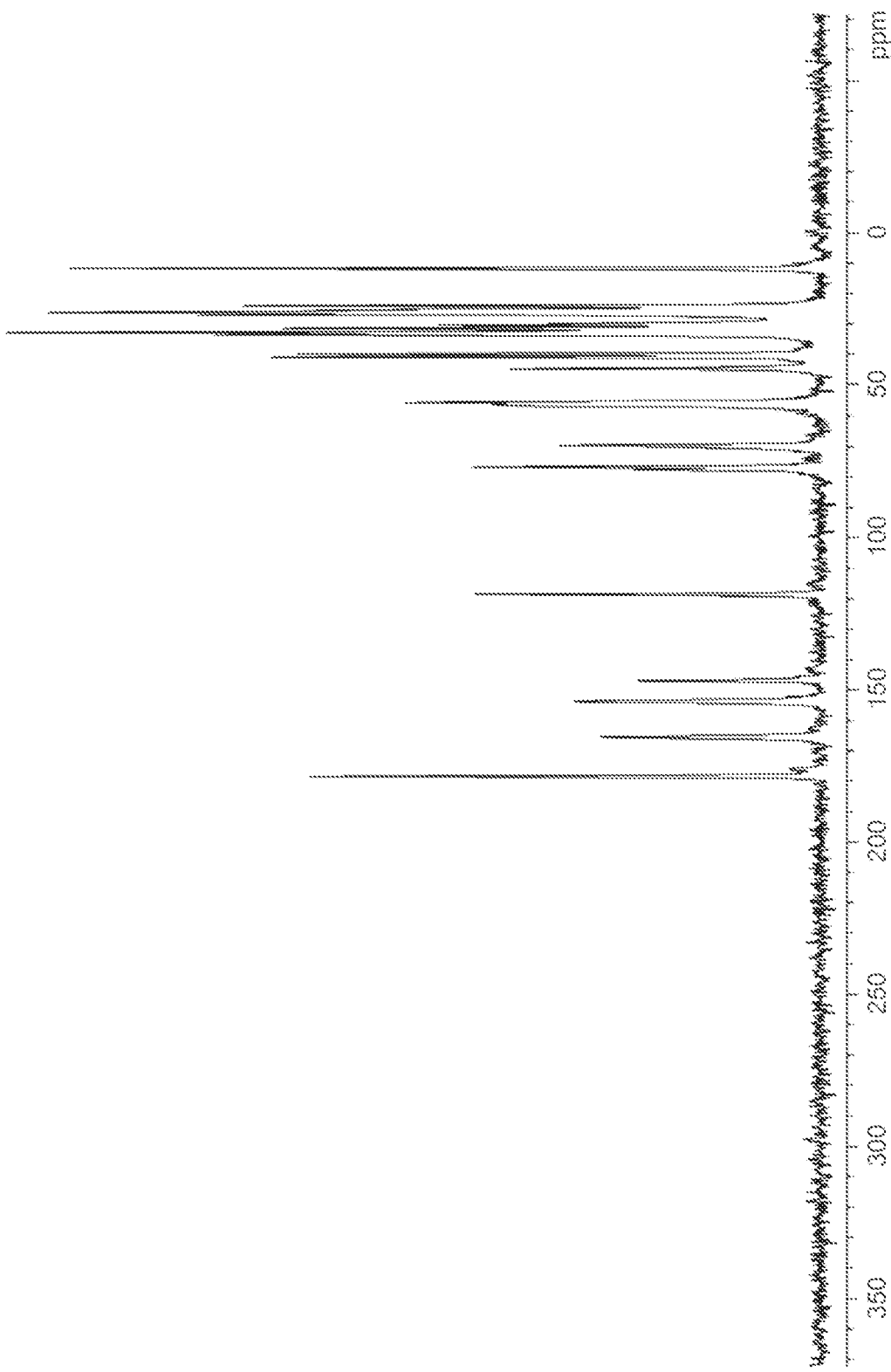
FIG. 8 is a carbon-13 solid-state nuclear magnetic resonance spectrum ($^{13}C$ NMR) corresponding Form B, a piperazine salt or co-crystal of Compound 1.

In one aspect, the piperazine salt or co-crystal of Compound 1 is crystalline and is characterized by a $^{13}$C NMR substantially as shown in FIG. 8.

In one aspect, the piperazine salt or co-crystal of Compound 1 is crystalline and is characterized by at least two of the following features (I-i)-(I-iv):

(I-i) an XRPD pattern having peaks at 4.9±0.2, 12.5±0.2, and 14.9±0.2 degrees two theta;

(I-ii) a TGA profile as shown in FIG. 6;

(I-iii) a DSC profile as shown in FIG. 7; or (I-iv) a $^{13}$C NMR substantially as shown in FIG. 8.

In one aspect, the piperazine salt or co-crystal of Compound 1 is crystalline and is a hydrate.

In one aspect, the piperazine salt or co-crystal of Compound 1 is crystalline and is Form B.

Figure 9:
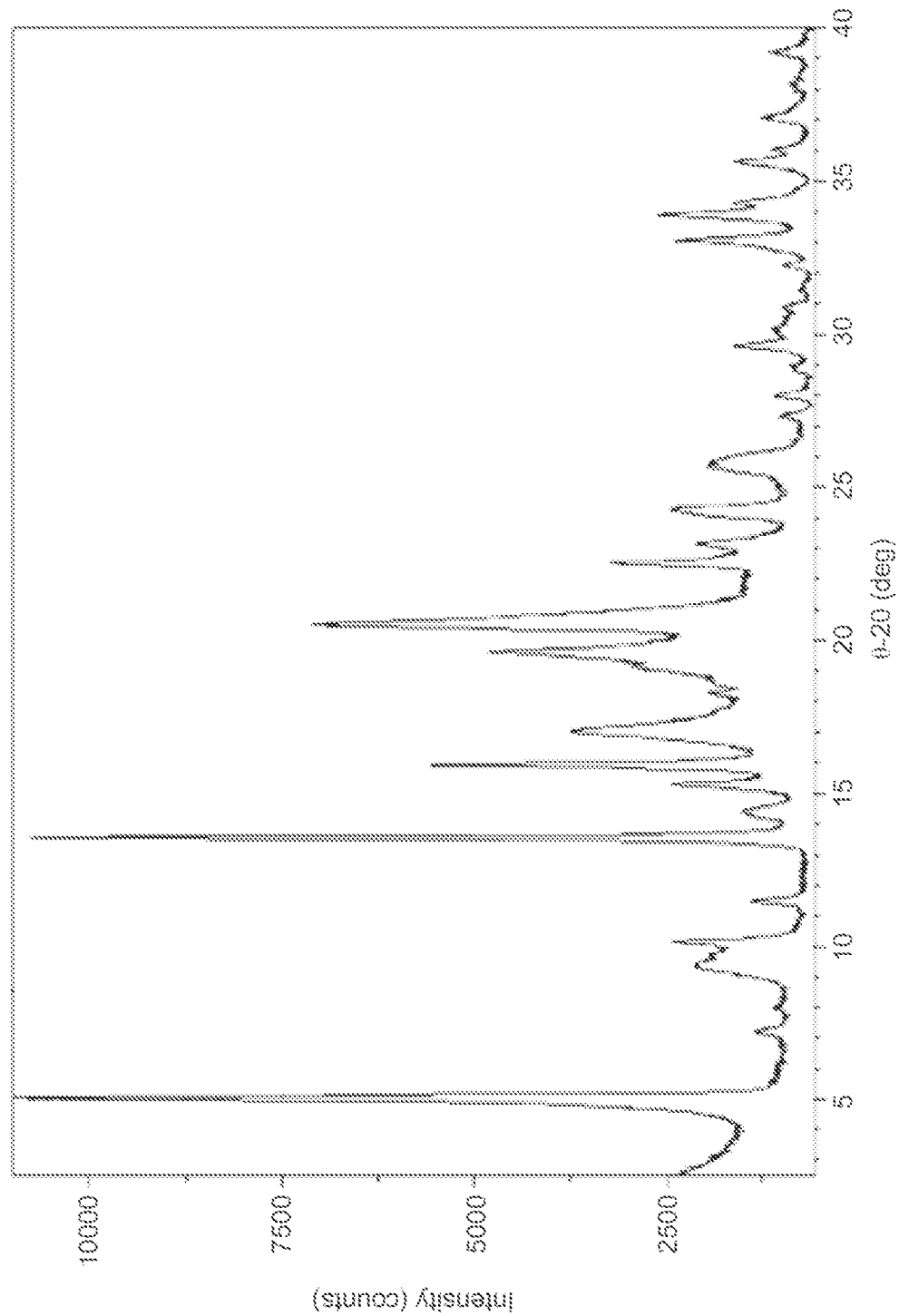
FIG. 9 is an XRPD corresponding to Form C, a piperazine salt or co-crystal of Compound 1.

In one aspect, the piperazine salt or co-crystal of Compound 1 is crystalline and is characterized by an XRPD pattern having peaks at 5.1±0.2, 13.6±0.2, and 20.5±0.2 degrees two theta. In one aspect, the piperazine salt or co-crystal of Compound 1 is crystalline and is characterized by an XRPD pattern having peaks at 5.1±0.2, 13.6±0.2, 15.9±0.2, 17.0±0.2, 19.6±0.2, and 20.5±0.2 degrees two theta. In one aspect, the piperazine salt or co-crystal of Compound 1 is crystalline and is characterized by an XRPD pattern substantially as shown in FIG. 9.

Figure 10:
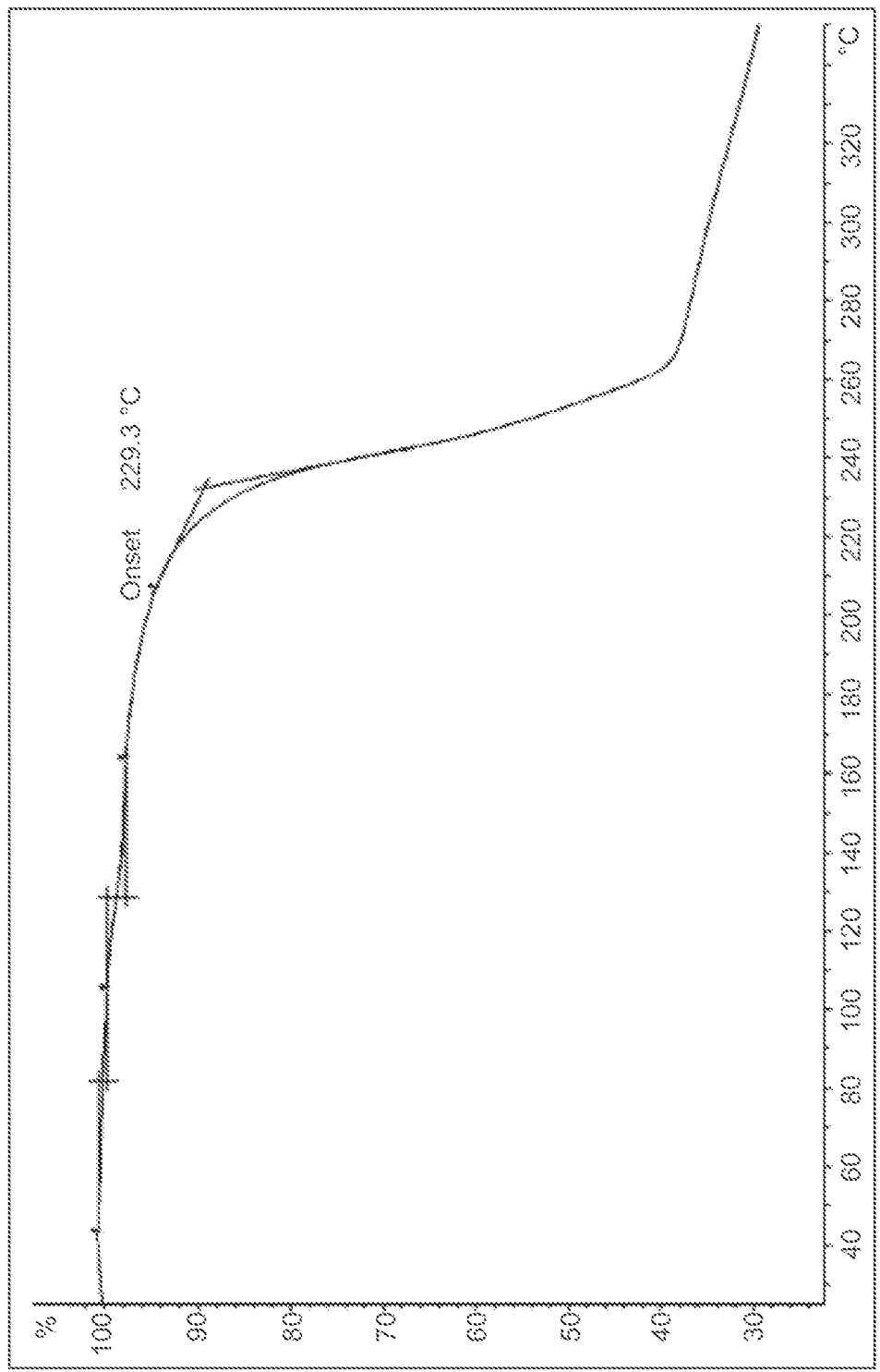
FIG. 10 is a TGA corresponding to Form C, a piperazine salt or co-crystal of Compound 1.

In one aspect, the piperazine salt or co-crystal of Compound 1 is crystalline and has a TGA profile showing a first weight loss of about 0.9 wt % between about 38° C. and about 100° C. and a second weight loss of about 2.1 wt % between about 100° C. and about 160° C. In one aspect, the piperazine salt or co-crystal of Compound 1 is crystalline and is characterized by a TGA profile substantially as shown in FIG. 10.

Figure 11:
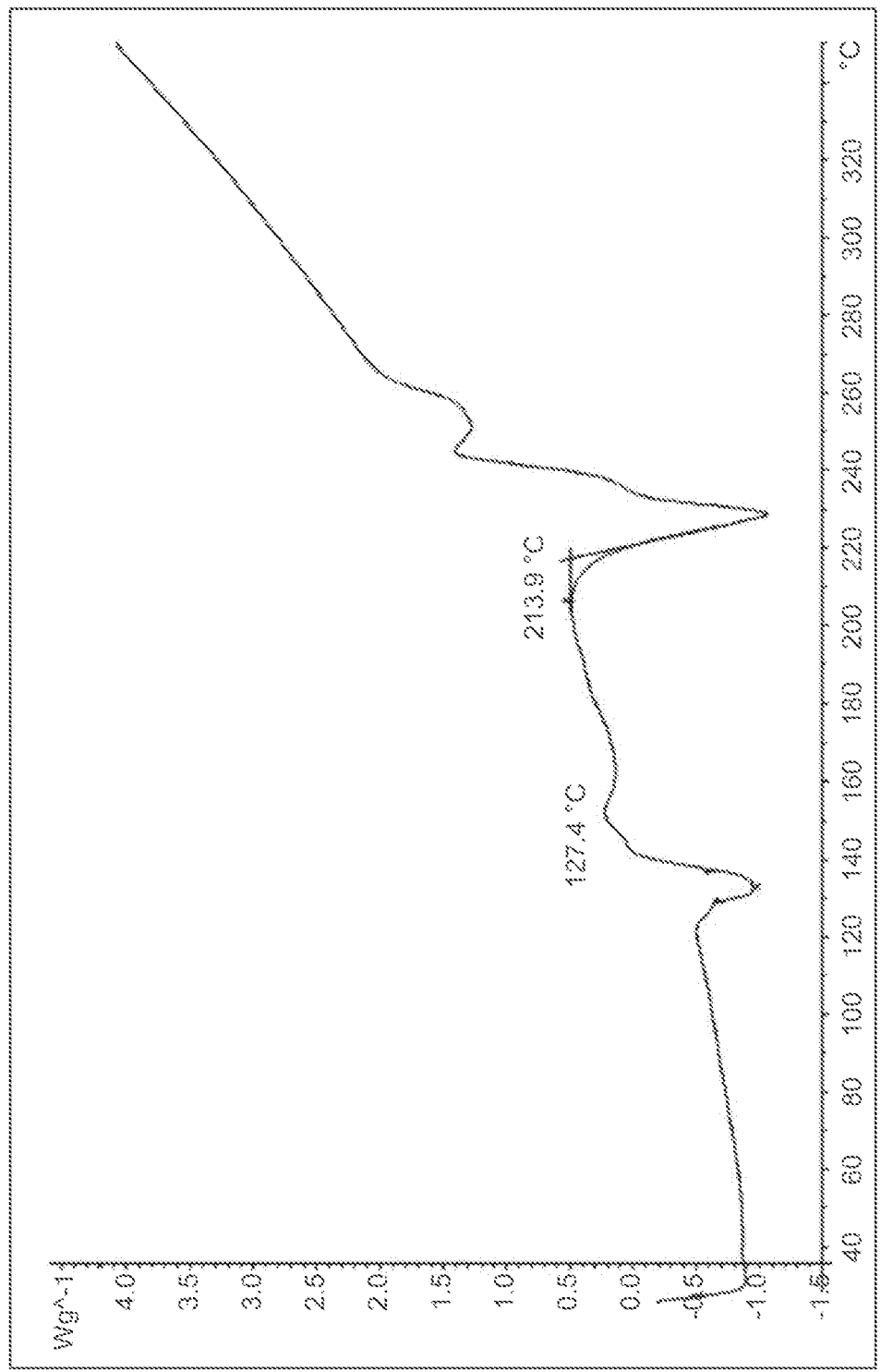
FIG. 11 is a DSC corresponding to Form C, a piperazine salt or co-crystal of Compound 1.

In one aspect, the piperazine salt or co-crystal of Compound 1 is crystalline and is characterized by an endothermic peak with onset at about 214° C., as determined by DSC. In one aspect, the piperazine salt or co-crystal of Compound 1 is crystalline and is characterized by a DSC profile substantially as shown in FIG. 11.

In one aspect, the piperazine salt or co-crystal of Compound 1 is crystalline and is characterized by the following XRPD pattern in Table 4 expressed in terms of the degree 2θ and relative intensities:

TABLE 4

| Angle (Degree 2θ) | Relative Intensity* (%) |
| --- | --- |
| 5.1 ± 0.20 | 100 |
| 7.2 ± 0.20 | 12 |
| 9.4 ± 0.20 | 19 |
| 10.2 ± 0.20 | 22 |
| 11.5 ± 0.20 | 13 |
| 13.6 ± 0.20 | 98 |
| 14.4 ± 0.20 | 14 |
| 15.3 ± 0.20 | 22 |
| 15.9 ± 0.20 | 51 |
| 17.0 ± 0.20 | 34 |
| 18.3 ± 0.20 | 17 |
| 19.6 ± 0.20 | 44 |
| 20.5 ± 0.20 | 65 |
| 22.5 ± 0.20 | 29 |
| 23.2 ± 0.20 | 19 |
| 24.3 ± 0.20 | 22 |
| 25.7 ± 0.20 | 18 |

TABLE 4-continued

| Angle (Degree 2θ) | Relative Intensity* (%) |
|---|---|
| 25.8 ± 0.20 | 18 |
| 27.3 ± 0.20 | 9 |
| 28.0 ± 0.20 | 10 |
| 29.6 ± 0.20 | 15 |

*The relative intensities can change depending on the crystal size and morphology.

In one aspect, the piperazine salt or co-crystal of Compound 1 is crystalline and is characterized by at least two of the following features (I-i)-(I-iii):
- (I-i) an XRPD pattern having peaks at 5.1±0.2, 13.6±0.2, and 20.5±0.2 degrees two theta;
- (I-ii) a TGA profile as shown in FIG. 10; or
- (I-iii) a DSC profile as shown in FIG. 11.

In one aspect, the piperazine salt or co-crystal of Compound 1 is crystalline and is Form C.

Figure 12:
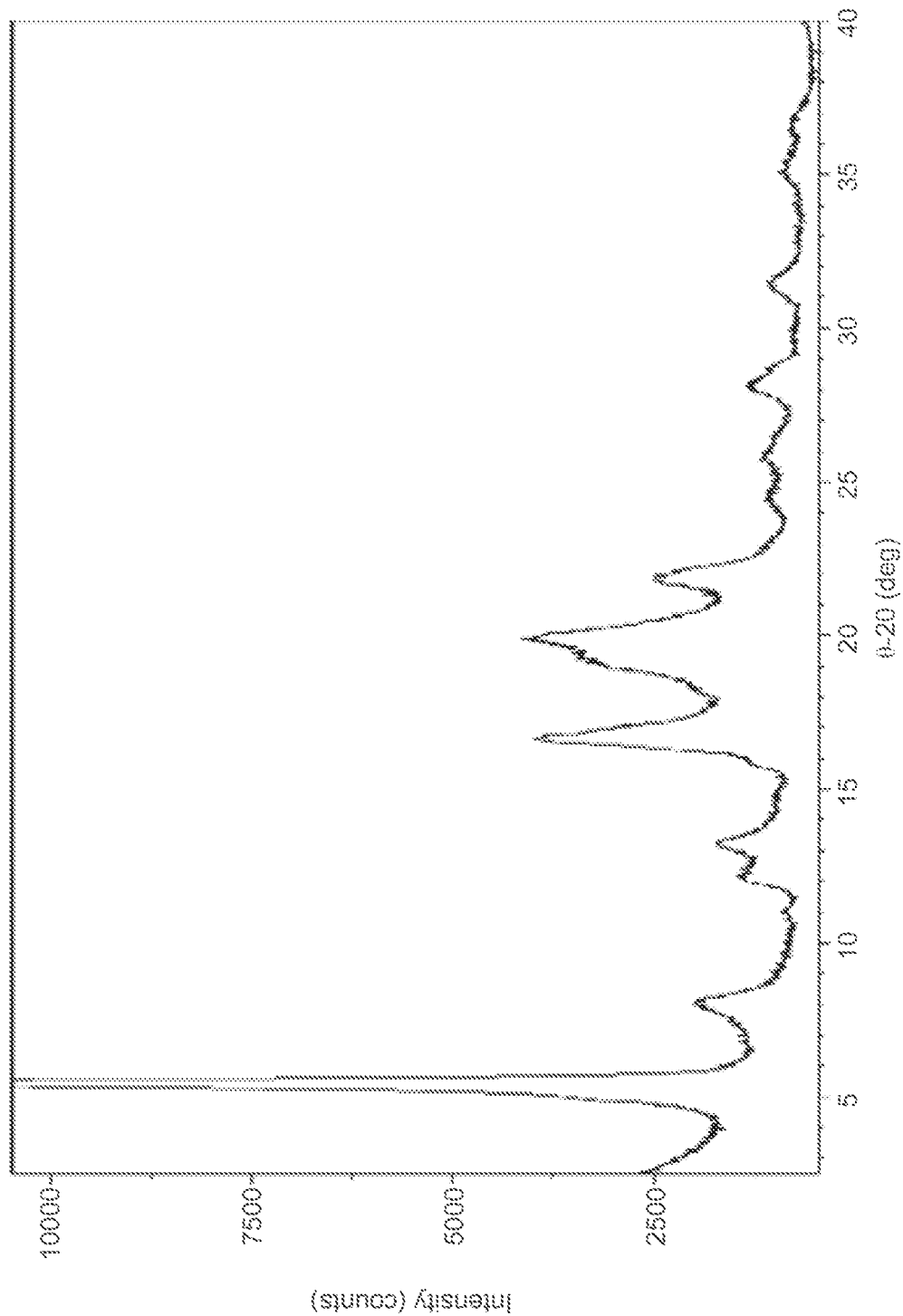
FIG. 12 is an XRPD corresponding to Form D, a piperazine salt or co-crystal of Compound 1.

In one aspect, the piperazine salt or co-crystal of Compound 1 is crystalline and is characterized by an XRPD pattern having peaks at 5.5±0.2, 16.7±0.2, and 19.9±0.2 degrees two theta. In one aspect, the piperazine salt or co-crystal of Compound 1 is crystalline and is characterized by an XRPD pattern having peaks at 5.5±0.2, 16.7±0.2, 19.9±0.2, and 21.8±0.2 degrees two theta. In one aspect, the piperazine salt or co-crystal of Compound 1 is crystalline and is characterized by an XRPD pattern substantially as shown in FIG. 12.

In one aspect, the piperazine salt or co-crystal of Compound 1 is crystalline and is characterized by the following XRPD pattern in Table 5 expressed in terms of the degree 2θ and relative intensities:

TABLE 5

| Angle (Degree 2θ) | Relative Intensity* (%) |
|---|---|
| 5.5 ± 0.20 | 100 |
| 8.0 ± 0.20 | 11 |
| 12.1 ± 0.20 | 8 |
| 13.2 ± 0.20 | 10 |
| 16.7 ± 0.20 | 22 |
| 19.9 ± 0.20 | 23 |
| 21.8 ± 0.20 | 14 |
| 24.4 ± 0.20 | 6 |
| 25.8 ± 0.20 | 6 |
| 28.1 ± 0.20 | 7 |
| 31.4 ± 0.20 | 6 |

*The relative intensities can change depending on the crystal size and morphology.

In one aspect, the piperazine salt of Compound 1 is crystalline and is Form D.

In one aspect, the piperazine salt or co-crystal of Compound 1 is a crystalline form that has a molar ratio of Compound 1 and piperazine about 1:1.

Figure 13:
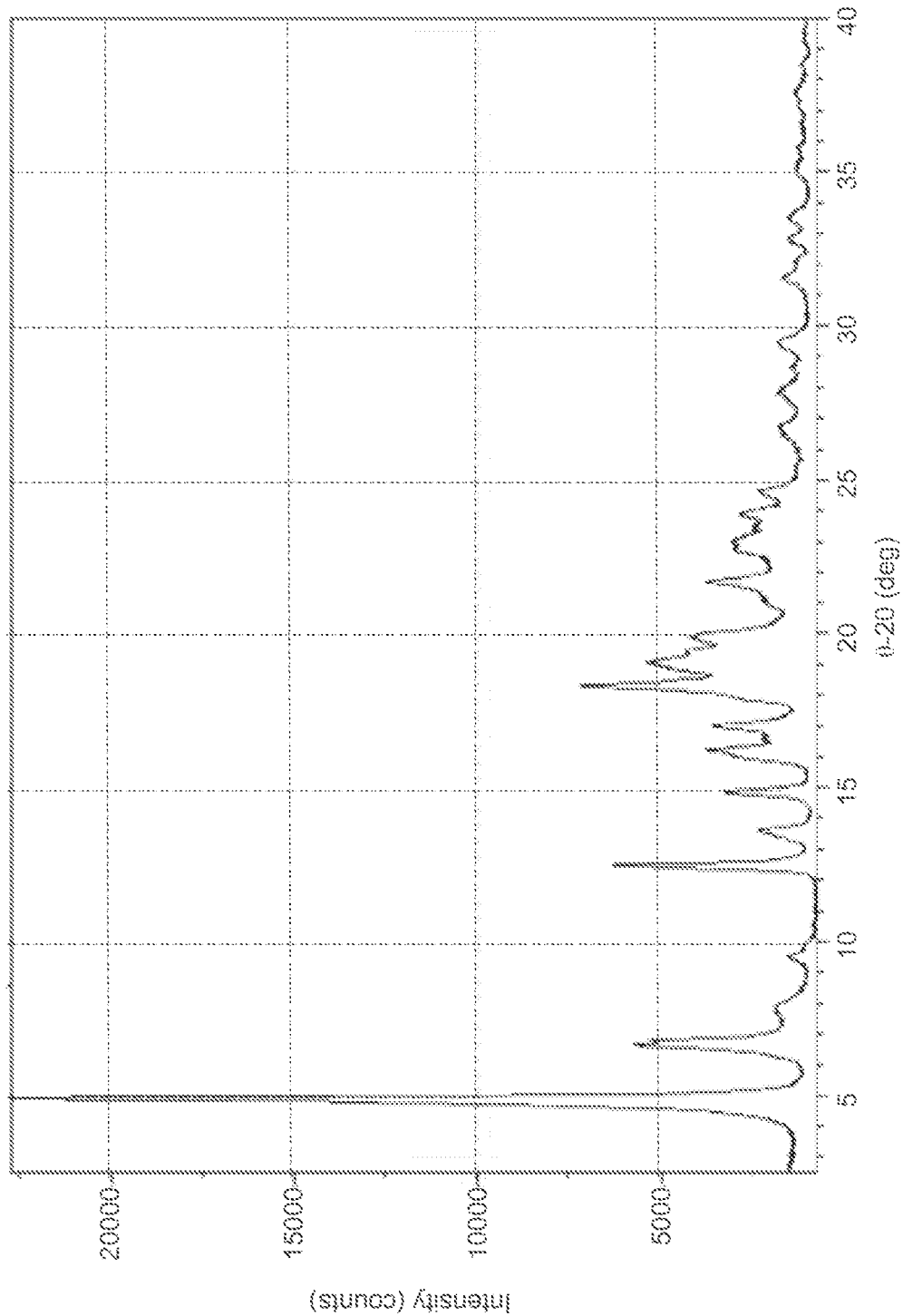
FIG. 13 is an XRPD corresponding to Form E, a piperazine salt or co-crystal of Compound 1.

In one aspect, the piperazine salt or co-crystal of Compound 1 is crystalline and is characterized by an XRPD pattern having peaks at 4.9±0.2, 12.5±0.2, and 18.3±0.2 degrees two theta. In one aspect, the piperazine salt or co-crystal of Compound 1 is crystalline and is characterized by an XRPD pattern having peaks at 4.9±0.2, 12.5±0.2, 13.6±0.2, and 18.3±0.2 degrees two theta. In one aspect, the piperazine salt or co-crystal of Compound 1 is crystalline and is characterized by an XRPD pattern substantially as shown in FIG. 13.

In one aspect, the piperazine salt or co-crystal of Compound 1 is crystalline and has a TGA profile showing about 11.2% weight loss between about 45° C. and about 150° C.

Figure 14:
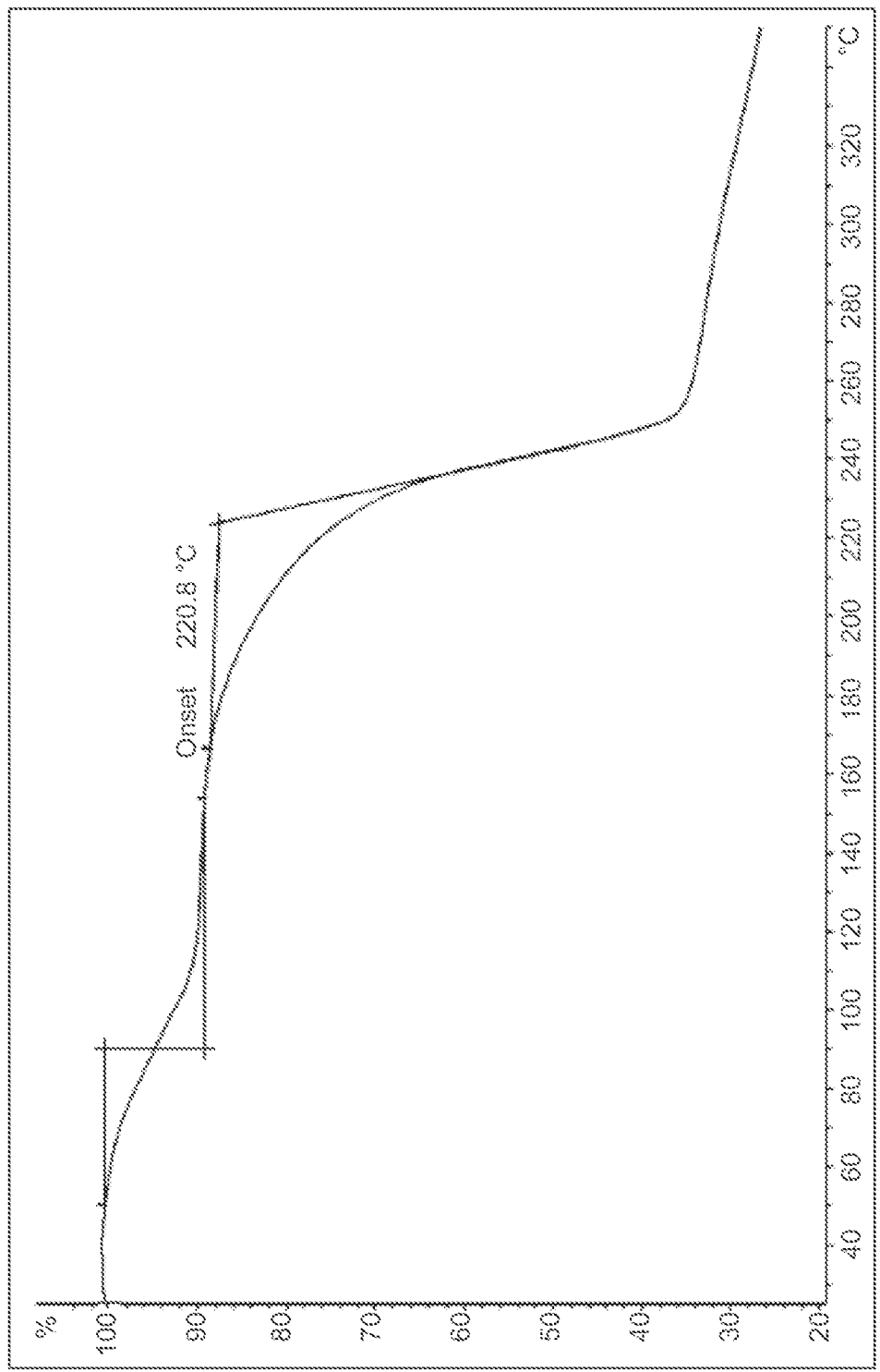
FIG. 14 is a TGA corresponding to Form E, a piperazine salt or co-crystal of Compound 1.

In one aspect, the piperazine salt or co-crystal of Compound 1 is crystalline and is characterized by a TGA profile substantially as shown in FIG. 14.

Figure 15:
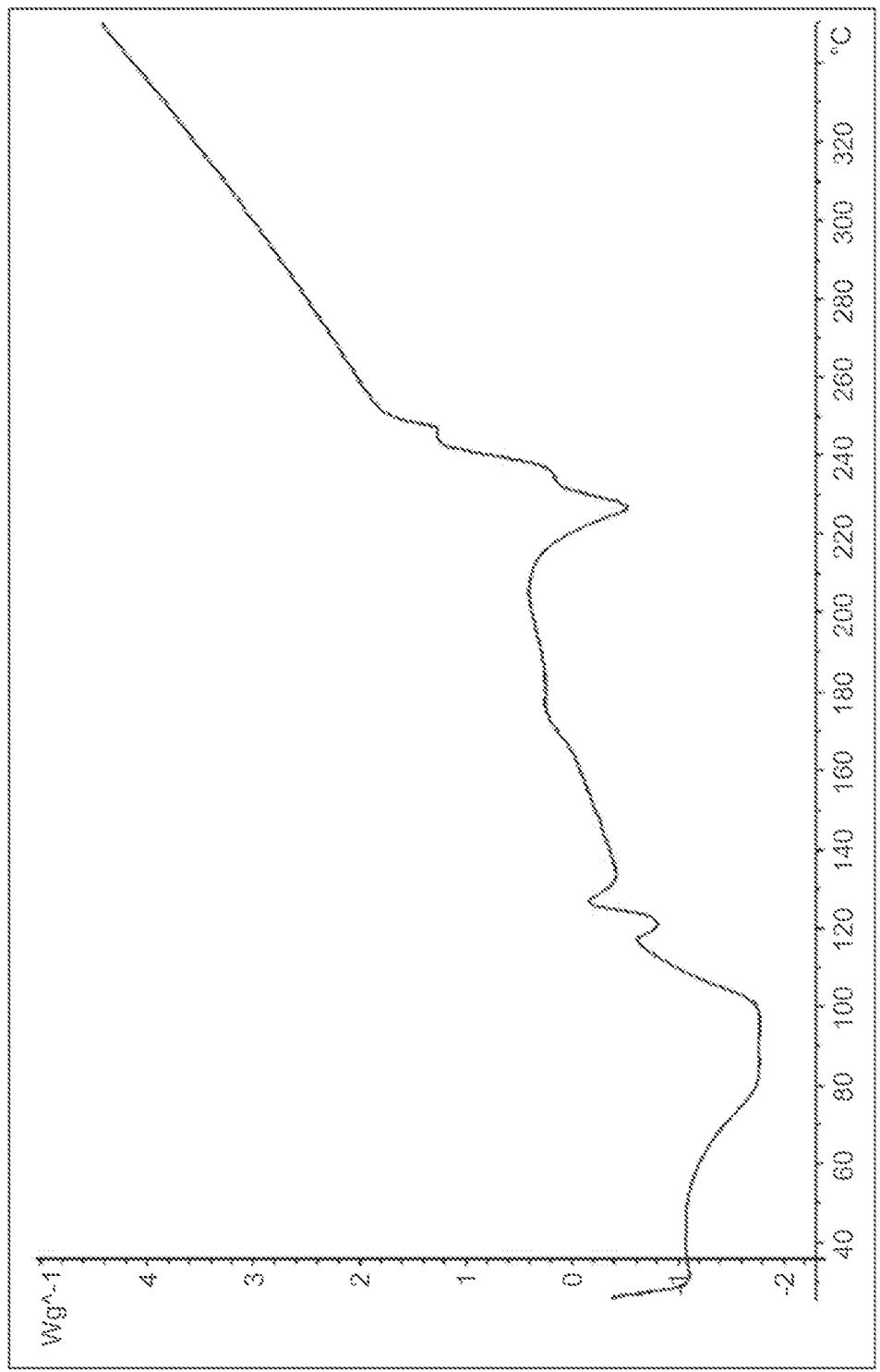
FIG. 15 is a DSC corresponding to Form E, a piperazine salt or co-crystal of Compound 1.

In one aspect, the crystalline form of the piperazine salt or co-crystal is characterized by an endothermic peak with onset at about 221° C., as determined by DSC. In one aspect, the piperazine salt or co-crystal of Compound 1 is crystalline and is characterized by a DSC profile substantially as shown in FIG. 15.

In one aspect, the piperazine salt or co-crystal of Compound 1 is crystalline and is characterized by the following XRPD pattern in Table 6 expressed in terms of the degree 2θ and relative intensities:

TABLE 6

| Angle (Degree 2θ) | Relative Intensity* (%) |
|---|---|
| 4.9 ± 0.20 | 100 |
| 6.6 ± 0.20 | 25 |
| 6.8 ± 0.20 | 24 |
| 7.8 ± 0.20 | 8 |
| 9.5 ± 0.20 | 7 |
| 12.5 ± 0.20 | 28 |
| 13.6 ± 0.20 | 10 |
| 14.9 ± 0.20 | 15 |
| 16.2 ± 0.20 | 17 |
| 17.0 ± 0.20 | 16 |
| 18.3 ± 0.20 | 31 |
| 19.1 ± 0.20 | 24 |
| 19.4 ± 0.20 | 19 |
| 19.9 ± 0.20 | 18 |
| 21.7 ± 0.20 | 17 |
| 22.7 ± 0.20 | 13 |
| 23.0 ± 0.20 | 13 |
| 23.9 ± 0.20 | 13 |
| 24.6 ± 0.20 | 10 |
| 26.7 ± 0.20 | 8 |
| 27.9 ± 0.20 | 8 |
| 29.5 ± 0.20 | 8 |

*The relative intensities can change depending on the crystal size and morphology.

In one aspect, the piperazine salt or co-crystal of Compound 1 is crystalline and is characterized by at least two of the following features (I-i)-(I-iii):
- (I-i) an XRPD pattern having peaks at 4.9±0.2, 12.5±0.2, and 18.3±0.2 degrees two theta;
- (I-ii) a TGA profile as shown in FIG. 12; or (I-iii) a DSC profile as shown in FIG. 13.

In one aspect, the piperazine salt or co-crystal of Compound 1 is crystalline and is Form E.

In one aspect, the piperazine salt or co-crystal of Compound 1 is crystalline and is substantially free of other polymorphic forms. In one aspect, the piperazine salt or co-crystal of Compound 1 is crystalline and has a polymorphic purity of at least 80%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99%.

C. Compound 1 Hydrochloride Salt

In one aspect, the hydrochloride salt of Compound 1 is a crystalline form that has a molar ratio of Compound 1 and hydrochloride about 1:1.

Figure 16:
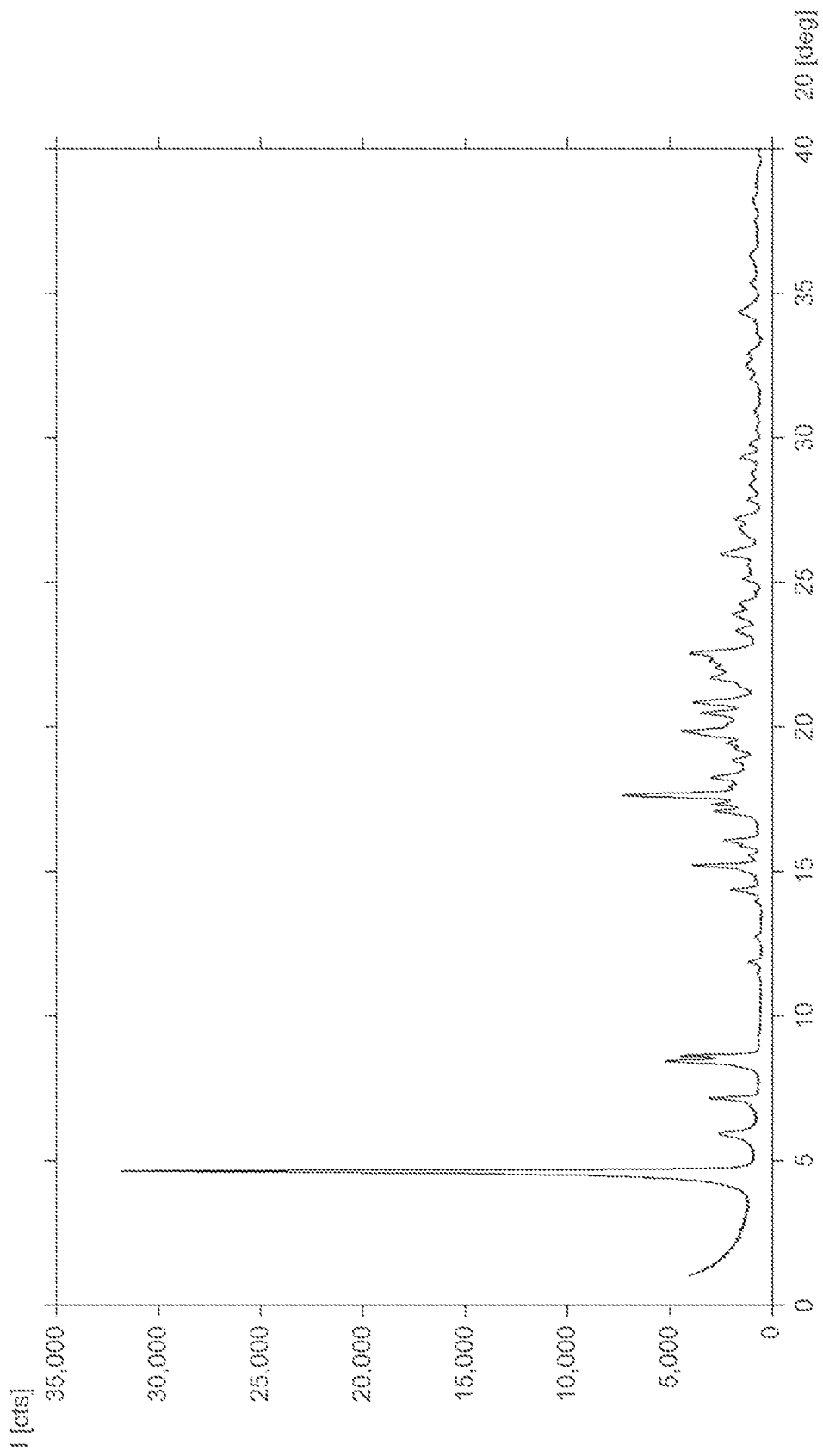
FIG. 16 is an XRPD corresponding to Form F, a hydrochloride salt or co-crystal of Compound 1.

In one aspect, the hydrochloride salt of Compound 1 is crystalline and is characterized by an XRPD pattern having peaks at 4.6±0.2, 7.2°±0.2, and 17.7°±0.2 degrees two theta. In one aspect, the hydrochloride salt of Compound 1 is crystalline and is characterized by an XRPD pattern having peaks at 4.6±0.2, 15.2±0.2, 7.2°±0.2, and 17.7°±0.2 degrees two theta. In one aspect, the hydrochloride salt of Compound 1 is crystalline and is characterized by an XRPD pattern substantially as shown in FIG. 16.

Figure 17:
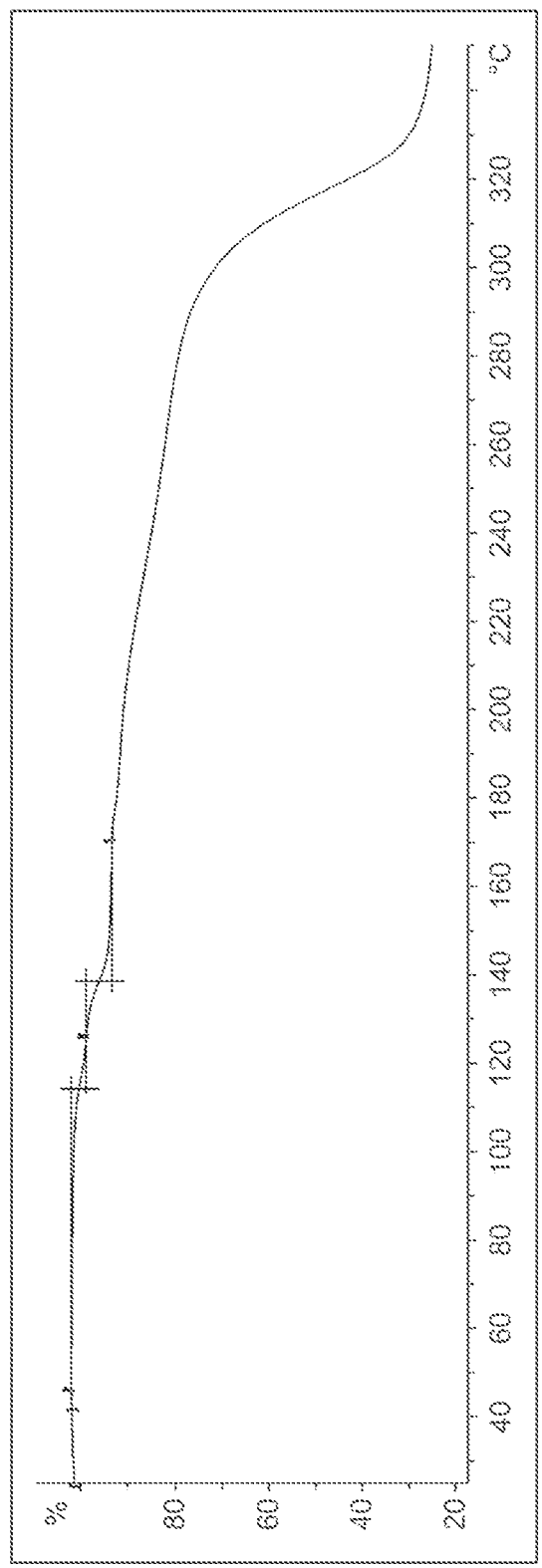
FIG. 17 is a TGA corresponding to Form F, a hydrochloride salt or co-crystal of Compound 1.

In one aspect, the hydrochloride salt of Compound 1 is crystalline and has a TGA profile showing a weight loss of about 3.2 wt % between about 40° C. and about 120° C. In one aspect, the hydrochloride salt of Compound 1 is crystalline and has a TGA profile showing a weight loss of about 5.5 wt % between about 120° C. and about 165° C. In one aspect, the hydrochloride salt of Compound 1 is crystalline and is characterized by a TGA profile substantially as shown in FIG. 17.

Figure 18:
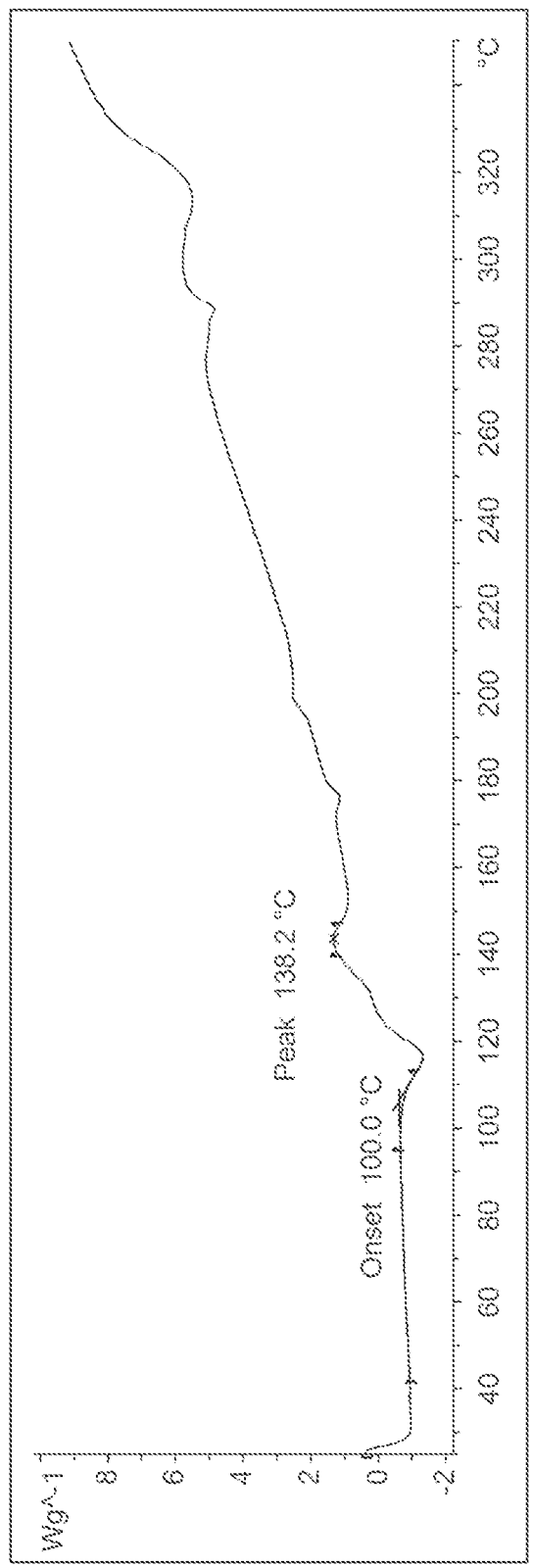
FIG. 18 is a DSC corresponding to Form F, a hydrochloride salt or co-crystal of Compound 1.

In one aspect, the hydrochloride salt of Compound 1 is crystalline and is characterized an endothermic peak with onset at about 100° C. and an exotherm with an onset of about 138° C., as determined by DSC. In one aspect, the hydrochloride salt of Compound 1 is crystalline and is by a DSC profile substantially as shown in FIG. 18.

In one aspect, the hydrochloride salt of Compound 1 is crystalline and is characterized by the following XRPD pattern in Table 7 expressed in terms of the degree 2θ and relative intensities:

TABLE 7

| Angle (Degree 2θ) | Relative Intensity* (%) |
|---|---|
| ±0.20 | 100 |
| ±0.20 | 8 |
| ±0.20 | 4 |
| ±0.20 | 10 |
| ±0.20 | 17 |
| 8.6 ± 0.20 | 14 |
| 11.4 ± 0.20 | 2 |
| 11.9 ± 0.20 | 4 |
| 12.7 ± 0.20 | 3 |
| 14.0 ± 0.20 | 3 |
| 14.4 ± 0.20 | 6 |
| 15.2 ± 0.20 | 12 |
| 15.5 ± 0.20 | 4 |
| 15.9 ± 0.20 | 5 |
| 16.1 ± 0.20 | 8 |
| 17.1 ± 0.20 | 9 |
| 17.3 ± 0.20 | 9 |
| 17.6 ± 0.20 | 23 |
| 17.9 ± 0.20 | 7 |
| 18.2 ± 0.20 | 9 |
| 18.8 ± 0.20 | 6 |
| 19.2 ± 0.20 | 6 |
| 19.4 ± 0.20 | 7 |
| 19.8 ± 0.20 | 14 |
| 20.5 ± 0.20 | 11 |
| 20.8 ± 0.20 | 12 |
| 21.7 ± 0.20 | 10 |
| 22.1 ± 0.20 | 9 |
| 22.5 ± 0.20 | 13 |
| 23.3 ± 0.20 | 6 |
| 23.9 ± 0.20 | 6 |
| 24.3 ± 0.20 | 5 |
| 24.6 ± 0.20 | 3 |
| 25.1 ± 0.20 | 4 |
| 25.6 ± 0.20 | 4 |
| 26.0 ± 0.20 | 8 |
| 26.9 ± 0.20 | 5 |
| 27.2 ± 0.20 | 6 |
| 27.9 ± 0.20 | 4 |
| 28.4 ± 0.20 | 3 |
| 28.8 ± 0.20 | 3 |
| 29.3 ± 0.20 | 5 |
| 29.8 ± 0.20 | 4 |

*The relative intensities can change depending on the crystal size and morphology.

In one aspect, the hydrochloride salt of Compound 1 is hydrochloride and is characterized by an IR pattern having peaks at 1119.0±2.0, 1540.2±2.0, and 1667.5±2.0 cm$^{-1}$. In one aspect, the hydrochloride salt of Compound 1 is crystalline and is characterized by an IR pattern having peaks at 1119.0±2.0, 1540.2±2.0, 1573.5±2.0, 1606.1±2.0, and 1667.5±2.0 cm$^{-1}$. In one aspect, the hydrochloride salt of Compound 1 is crystalline and is characterized by the following IR peaks in Table 8.

TABLE 8

| Position (cm$^{-1}$) | Log (1/R) |
|---|---|
| 705.9 | 0.0254 |
| 712.6 | 0.0268 |
| 726.9 | 0.0195 |
| 745.7 | 0.0241 |
| 792.3 | 0.0237 |
| 847.3 | 0.0082 |
| 873.9 | 0.0103 |
| 894.0 | 0.0147 |
| 910.9 | 0.0168 |
| 973.5 | 0.0135 |
| 982.9 | 0.0134 |
| 1001.2 | 0.0193 |
| 1045.3 | 0.0167 |
| 1099.7 | 0.0421 |
| 1119.0 | 0.0610 |
| 1145.5 | 0.0198 |
| 1163.7 | 0.0135 |
| 1184.0 | 0.0125 |
| 1208.9 | 0.0110 |
| 1244.0 | 0.0283 |
| 1267.8 | 0.0319 |
| 1298.0 | 0.0527 |
| 1351.7 | 0.0318 |
| 1367.2 | 0.0437 |
| 1409.3 | 0.0238 |
| 1425.0 | 0.0207 |
| 1457.7 | 0.0177 |
| 1504.2 | 0.0118 |
| 1540.2 | 0.0399 |
| 1573.5 | 0.0315 |
| 1667.5 | 0.0869 |
| 1706.7 | 0.0285 |
| 2431.9 | 0.0048 |
| 2517.3 | 0.0059 |
| 2789.4 | 0.0095 |
| 2859.4 | 0.0167 |
| 2938.5 | 0.0244 |
| 3024.2 | 0.0092 |
| 3091.2 | 0.0088 |
| 3223.9 | 0.0039 |
| 3388.9 | 0.0053 |
| 3531.0 | 0.0022 |

Figure 19:
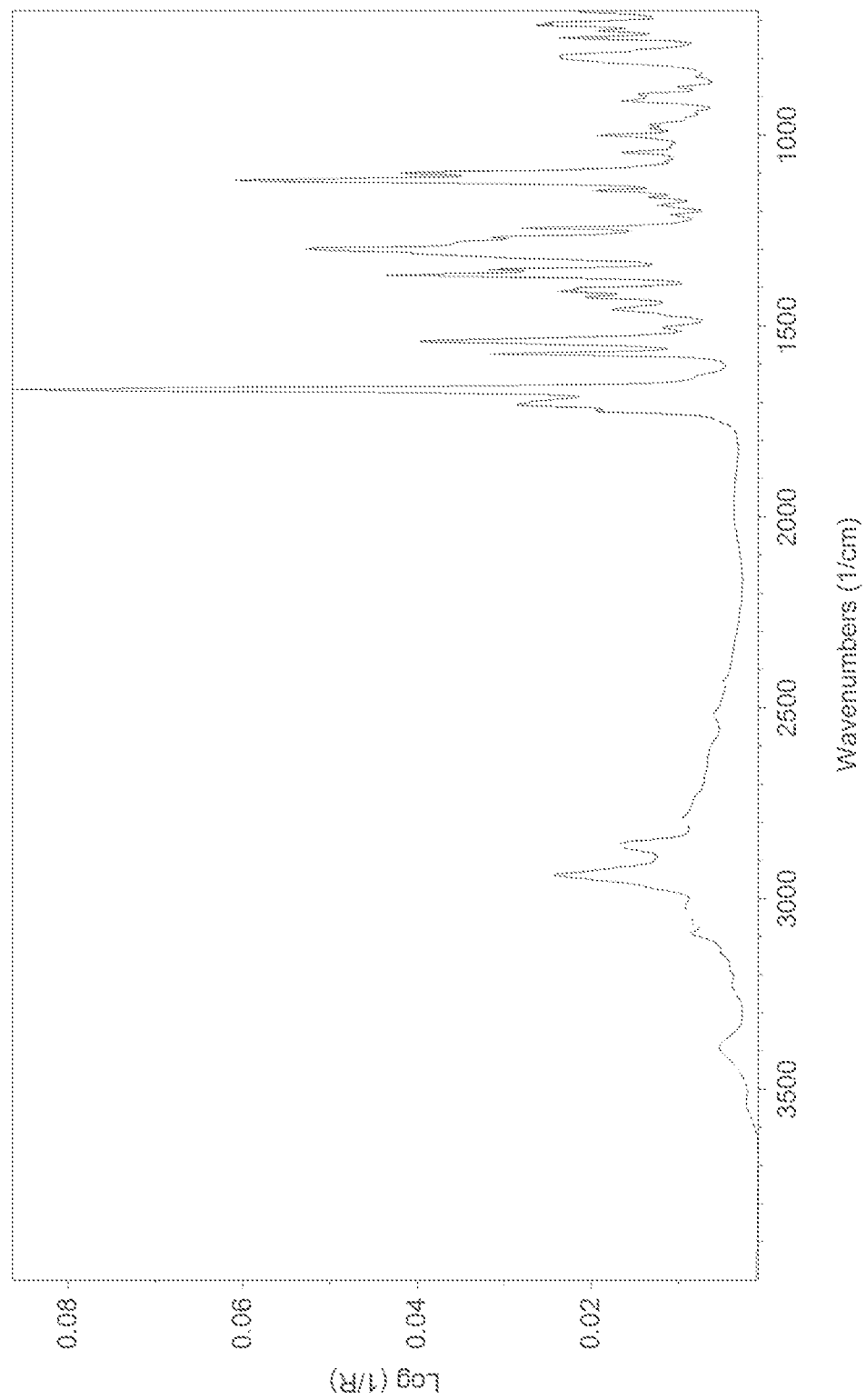
FIG. 19 is an IR of Form F, a sodium salt of Compound 1.

In one aspect, the hydrochloride salt of Compound 1 is crystalline and is characterized by an IR pattern substantially as shown in FIG. 19.

In one aspect, the hydrochloride salt of Compound 1 is crystalline and is characterized by at least two of the following features (I-i)-(I-v):
 (I-i) an XRPD pattern having peaks at 4.6±0.2, 7.2°±0.2, and 17.7°±0.2 degrees two theta;
 (I-ii) a TGA profile as shown in FIG. 17;
 (I-iii) a DSC profile as shown in FIG. 18; or
 (I-iv) an IR pattern having peaks as listed in Table 8.

In one aspect, the hydrochloride salt of Compound 1 is crystalline and is Form F.

In one aspect, the hydrochloride salt of Compound 1 is crystalline and is substantially free of other polymorphic forms. In one aspect, the hydrochloride salt of Compound 1 is crystalline and has a polymorphic purity of at least 80%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99%.

In one aspect, the salts or co-crystals of Compound 1 disclosed herein comprise a detectable amount of crystalline form of Compound 1 as a free acid. In some aspects, the salts or co-crystals of Compound 1 disclosed herein comprise a detectable amount of crystalline form of Compound 1 as a free acid, where the free acid is in crystalline form.

IV. Pharmaceutical Compositions

In one aspect, the disclosure provides a pharmaceutical composition comprising one or more of the salts or co-crystals of Compound 1 disclosed herein.

In one aspect, the pharmaceutical composition comprises a crystalline form of the salt or co-crystal of Compound 1. In one aspect, the pharmaceutical composition comprises a salt or co-crystal of Compound 1 that is anhydrous, a hydrate, or a solvate. In one aspect, the pharmaceutical composition comprises a salt or co-crystal of Compound 1 described herein.

Pharmaceutical compositions comprising the one or more salts or co-crystals of Compound 1 can be in a form suitable for oral use, for example, as tablets, troches, lozenges, dispersible powders or granules, or hard or soft capsules. Compositions intended for oral use can be prepared according to any known method, and such compositions can contain one or more agents selected from the group consisting of sweetening agents, flavoring agents, coloring agents, and preserving agents in order to provide pharmaceutically elegant and palatable preparations.

In one aspect, the pharmaceutical composition comprises about 100 mg to about 1500 mg, about 100 mg to about 1400 mg, about 100 mg to about 1300 mg, about 100 mg to about 1200 mg, about 100 mg to about 1100 mg, about 100 mg to about 1000 mg, about 100 mg to about 900 mg, about 100 mg to about 800 mg, about 100 mg to about 700 mg, about 100 mg to about 600 mg, about 100 mg to about 500 mg, about 100 mg to about 400 mg, about 100 mg to about 300 mg, about 100 mg to about 200 mg, or about 100 mg to about 150 mg of one or more of the salts or co-crystals of Compound 1 disclosed herein. In one aspect, the pharmaceutical composition comprises about 100 mg, about 200 mg, about 300 mg, about 400 mg, about 500 mg, about 600 mg, about 700 mg, about 800 mg, about 900 mg, about 1000 mg, about 1100 mg, about 1200 mg, about 1300 mg, about 1400 mg, or about 1500 mg of one or more of the salts or co-crystals of Compound 1 disclosed herein.

In some aspects, the pharmaceutical composition is an oral tablet. In some aspects, the oral tablet comprises about 0.1 mg to 2000 mg of a salt or co-crystal of Compound 1 disclosed herein. In some aspects, the oral tablet comprises about 1 mg to about 2000 mg of a salt or co-crystal of Compound 1 disclosed herein. In some aspects, the oral tablet comprises about 1 mg to about 1000 mg of a salt or co-crystal of Compound 1 disclosed herein. In some aspects, the oral tablet comprises about 100 mg to about 800 mg of a salt or co-crystal of Compound 1 disclosed herein. In some aspects, the oral tablet comprises about 50 mg to about 400 mg of a salt or co-crystal of Compound 1 disclosed herein. In some aspects, the oral tablet comprises about 100 mg to about 400 mg of a salt or co-crystal of Compound 1 disclosed herein. In some aspects, the oral tablet comprises about 100 mg to about 300 mg of a salt or co-crystal of Compound 1 disclosed herein. In some aspects, the oral tablet comprises about 500 mg to about 1000 mg of a salt or co-crystal of Compound 1 disclosed herein. In some aspects, the oral tablet comprises about 0.1 mg, about 0.5 mg, about 1 mg, about 5 mg, about 10 mg, about 20 mg, about 30 mg, about 40 mg, about 50 mg, about 60 mg, about 70 mg, about 80 mg, about 90 mg, about 100 mg, about 125 mg, about 150 mg, about 175 mg, about 200 mg, about 225 mg, about 250 mg, about 275 mg, about 300 mg, about 325 mg, about 350 mg, about 375 mg, about 400 mg, about 425 mg, about 450 mg, about 475 mg, about 500 mg, about 550 mg, about 600 mg, about 650 mg, about 700 mg, about 750 mg, about 800 mg, about 850 mg, about 900 mg, about 1000 mg, about 1050 mg, about 1100 mg, about 1150 mg, about 1200 mg, about 1250 mg, about 1300 mg, about 1350 mg, about 1400 mg, about 1450 mg, about 1500 mg, about 1550 mg, about 1600 mg, about 1650 mg, about 1700 mg, about 1750 mg, about 1800 mg, about 1850 mg, about 1900 mg, about 1950 mg, or about 2000 mg of a salt or co-crystal of Compound 1 disclosed herein. In some aspects, the oral tablet comprises 800 mg of a salt or co-crystal of Compound 1 disclosed herein. In some aspects, the oral tablet comprises 400 mg of a salt or co-crystal of Compound 1 disclosed herein. In some aspects, the oral tablet comprises 300 mg of a salt or co-crystal of Compound 1 disclosed herein. In some aspects, the oral tablet comprises about 200 mg of a salt or co-crystal of Compound 1 disclosed herein.

V. Methods of Treatment

In another aspect, the present disclosure provides a method for treating a type of diabetes mellitus comprises administering the pharmaceutically acceptable composition disclosed herein to a patient in need thereof. The method can comprise administering a pharmaceutical composition comprising a therapeutically effective amount of one or more salts or co-crystals of Compound 1 disclosed herein to a patient in need thereof.

In one aspect, the patient has type 1 diabetes mellitus. In one aspect, the patient has type 2 diabetes mellitus.

In some aspects, the patient is being treated with an insulin therapy. In some aspects, the insulin therapy is a continuous insulin infusion. In some aspects, the insulin therapy is a continuous subcutaneous insulin infusion. In some aspects, the insulin therapy is a multiple daily doses of insulin.

In another aspect, the present disclosure provides a method for the treatment of glucokinase-deficiency mediated conditions or diseases, or conditions benefiting from an increase in glucokinase activity, comprising administering to a subject in need thereof a compound or a pharmaceutical composition of the present disclosure.

In another aspect, the present disclosure provides a method for treatment of metabolic disorders, for blood glucose lowering, for the treatment of hyperglycemia, for the treatment of hypoglycemia for the treatment of impaired glucose tolerance (IGT), for the treatment of Syndrome X, for the treatment of impaired fasting glucose (IFG), for delaying the progression of impaired glucose tolerance (IGT) to type 2 diabetes, for delaying the progression of non-insulin requiring type 2 diabetes to insulin requiring type 2 diabetes, for the treatment of dyslipidemia, for the treatment of hyperlipidemia, for the treatment of hypertension, for lowering of food intake, for appetite regulation, for the treatment of obesity, for regulating feeding behavior, or for enhancing the secretion of enteroincretins, comprising administering to a subject in need of such treatment a compound or a pharmaceutical composition of the present disclosure.

In another aspect, the present disclosure provides a method for the preservation of beta-cell mass and function comprising administering to a subject in need of such treatment a compound or a pharmaceutical composition of the present disclosure.

In another aspect, the present disclosure provides a method of preserving and/or increasing beta-cell mass and function in a subject having undergone pancreatic islet transplantation comprising administering to a subject in need of such treatment a compound or a pharmaceutical composition of the present disclosure.

In another aspect, the present disclosure provides a method of improving liver function and/or survival in subjects undergoing liver transplantation comprising administering to a subject in need of such treatment a compound or a pharmaceutical composition of the present disclosure.

In a further aspect, the administration occurs before, during or after transplantation, or any combination thereof.

In another aspect, the present disclosure provides a method of preventing diabetic ketoacidosis or reducing the occurrence of diabetic ketoacidosis events in a subject comprising administering to a subject in need of such treatment a compound or a pharmaceutical composition of the present disclosure.

Depending on the condition, disorder, or disease to be treated and the subject's condition, the pharmaceutical compositions provided herein can be administered by oral, parenteral (e.g., intramuscular, intraperitoneal, intravenous or intraarterial (e.g., via catheter), ICV, intracistemal injection or infusion, subcutaneous injection, or implant), inhalation, nasal, vaginal, rectal, sublingual, and/or topical (e.g., transdermal or local) routes of administration, and can be formulated alone or together in suitable dosage unit with a pharmaceutically acceptable vehicle, carrier, diluent, excipient, or a mixture thereof, appropriate for each route of administration. In one aspect, the pharmaceutical composition is administered orally.

For oral administration, the pharmaceutical compositions provided herein can be provided in solid, semisolid, or liquid dosage forms for oral administration. As used herein, oral administration also includes buccal, lingual, and sublingual administration. Suitable oral dosage forms include, but are not limited to, tablets, capsules, pills, troches, lozenges, pastilles, cachets, pellets, medicated chewing gum, granules, bulk powders, effervescent or non-effervescent powders or granules, solutions, emulsions, suspensions (e.g., aqueous or oil suspensions), wafers, sprinkles, elixirs, syrups, bolus, electuaries, or pastes. In one aspect, the pharmaceutical composition is administered as a tablet.

The dose can be in the form of one, two, three, four, five, six, or more sub-doses that are administered at appropriate intervals per day. The dose or sub-doses can be administered in the form of dosage units containing from about 1 mg to about 2000 mg, from about 10 mg to about 2000 mg, from about 100 mg to about 1500 mg, from about 200 mg to about 1500 mg, from about 200 mg to about 1500 mg, from about 300 mg to about 1500 mg, from about 400 mg to about 1500 mg, from about 500 mg to about 1500 mg, from about 500 mg to about 1000 mg, or from about 500 mg to about 800 mg of Compound 1 per dosage unit. For example, the dose or subdoses can be administered in the form of dosage units containing about 100 mg, about 200 mg, about 300 mg, about 400 mg, about 500 mg, about 600 mg, about 700 mg, about 800 mg, about 900 mg, about 1000 mg, about 1100 mg, about 1200 mg, about 1300 mg, about 1400 mg, about 1500 mg, about 1600 mg, about 1700 mg, about 1800 mg, about 1900 mg, or about 2000 mg of one or more of the salts or co-crystals of Compound 1 disclosed herein.

In one aspect, the patient is administered once daily about 2000 mg, about 1500 mg, about 1000 mg, about 800 mg, about 500 mg, about 300 mg, or about 100 mg of one or more of the salts or co-crystals of Compound 1 disclosed herein.

In one aspect, the patient is administered once daily 100 mg to about 1500 mg, about 200 mg to about 1500 mg, about 200 mg to about 1500 mg, about 300 mg to about 1500 mg, about 400 mg to about 1500 mg, about 500 mg to about 1500 mg, about 500 mg to about 1000 mg, or about 500 mg to about 800 mg one or more of the salts or co-crystals of Compound 1 disclosed herein.

In some aspects, the patient is administered about 0.1 mg to about 2000 mg of a salt or co-crystal of Compound 1 disclosed herein daily. In some aspects, the patient is administered about 1 mg to about 2000 mg of a salt or co-crystal of Compound 1 disclosed herein daily. In some aspects, the patient is administered about 100 mg to about 800 mg of a salt or co-crystal of Compound 1 disclosed herein daily. In some aspects, the patient is administered about 50 mg to about 400 mg of a salt or co-crystal of Compound 1 disclosed herein daily. In some aspects, the patient is administered about 100 mg to about 400 mg of a salt or co-crystal of Compound 1 disclosed herein daily. In some aspects, the patient is administered about 100 mg to about 300 mg of a salt or co-crystal of Compound 1 disclosed herein daily. In some aspects, the patient is administered about 500 mg to about 1000 mg of a salt or co-crystal of Compound 1 disclosed herein daily. In some aspects, the patient is administered about 0.1 mg, about 0.5 mg, about 1 mg, about 5 mg, about 10 mg, about 20 mg, about 30 mg, about 40 mg, about 50 mg, about 60 mg, about 70 mg, about 80 mg, about 90 mg, about 100 mg, about 125 mg, about 150 mg, about 175 mg, about 200 mg, about 225 mg, about 250 mg, about 275 mg, about 300 mg, about 325 mg, about 350 mg, about 375 mg, about 400 mg, about 425 mg, about 450 mg, about 500 mg, about 550 mg, about 1000 mg, about 1050 mg, about 1100 mg, about 1150 mg, about 1200 mg, about 1250 mg, about 1300 mg, about 1350 mg, about 1400 mg, about 1450 mg, about 1500 mg, about 1550 mg, about 1600 mg, about 1650 mg, about 1700 mg, about 1750 mg, about 1800 mg, about 1850 mg, about 1900 mg, about 1950 mg, or about 2000 mg, of a salt or co-crystal of Compound 1 disclosed herein once daily. In some aspects, the patient is administered about 800 mg of a salt or co-crystal of Compound 1 disclosed herein once daily. In some aspects, the patient is administered about 400 mg of a salt or co-crystal of Compound 1 disclosed herein once daily. In some aspects, the patient is administered about 300 mg of a salt or co-crystal of Compound 1 disclosed herein once daily. In some aspects, the patient is administered about 200 mg of a salt or co-crystal of Compound 1 disclosed herein once daily. In some aspects, the patient is administered about 100 mg of a salt or co-crystal of Compound 1 disclosed herein once daily.

EXAMPLES

A. Abbreviations and Acronyms i. Analytical Techniques

| NMR | Nuclear Magnetic Resonance Spectroscopy |
|---|---|
| XRPD | X-ray Powder Diffraction |
| HSM | Hot-stage microscopy |

-continued

| | |
|---|---|
| TGA | Thermogravimetric Analysis |
| DSC | Differential Scanning Calorimetry |
| DVS | Dynamic vapor sorption |
| IC | Ion chromatography |
| IR | Infrared | ii. Solvents and Reagents

| | |
|---|---|
| ACN | acetonitrile |
| DCM | dichloromethane |
| EtOAc | ethyl acetate |
| EtOH | Ethanol |
| Et2O | diethyl ether |
| IPA | isopropyl alcohol |
| iPrOAc | isopropyl acetate |
| MEK | methyl ethyl ketone |
| MeOH | Methanol |
| TFE | trifluoroethanol |
| THF | tetrahydrofuran |
| tris | tris(hydroxymethyl)aminomethane | iii. Miscellaneous

| | |
|---|---|
| ~ | approximate(ly) |
| agg. | aggregates |
| API | active pharmaceutical ingredient |
| B | birefringence |
| d | day(s) |
| decomp | decomposition |
| E | Extinction |
| FE | fast evaporation |
| h | hour(s) |
| min | minute(s) |
| ppt | precipitation |
| RT | room temperature |
| UM | unknown morphology |
| VF | vacuum filtration |
| v/v | volume/volume |
| w/ | With |
| wt | Weight |

B. General Experimental Methods i. Fast Evaporation

Solutions containing Compound 1 and a specified guest were prepared in selected solvents in clean glass vials, and allowed to evaporate at ambient temperature from open vials.

ii. Vacuum Filtration

Suspensions were vacuum filtered on 0.45 μm nylon filter membranes using a water aspirator.

iii. Relative Humidity (RH) Stress

Specified solids were exposed to 94% RH condition by placing the solids into an uncapped clean glass vial, and the vial was covered with performated Al foil and placed inside a sealed jar at the controlled RH condition maintained by a saturated solution of KNO3. The sealed jar was kept at ambient temperature.

C. Instrumental Techniques i. X-Ray Powder Diffraction (XRPD)
Method a: Transmission Geometry XRPD patterns were collected with a PANalytical X'Pert PRO MPD diffractometer or a PANalytical Empyrean diffractometer using an incident beam of Cu radiation produced using an Optix long, fine-focus source. An elliptically graded multilayer mirror was used to focus Cu Kα X-ray radiation through the specimen and onto the detector. Prior to the analysis, a silicon specimen (NIST SRM 640e) was analyzed to verify the observed position of the Si (111) peak is consistent with the NIST-certified position. A specimen of the sample was sandwiched between 3-μm-thick films and analyzed in transmission geometry. A beam-stop, short antiscatter extension, and antiscatter knife edge, were used to minimize the background generated by air. Soller slits for the incident and diffracted beams were used to minimize broadening from axial divergence. Diffraction patterns were collected using a scanning position-sensitive detector (X'Celerator) located 240 mm from the specimen and Data Collector software v. 5.5.

Method b: Reflection

XRPD patterns were collected with a PANalytical X'Pert PRO MPD diffractometer using an incident beam of Cu Kα radiation produced using a long, fine-focus source and a nickel filter. The diffractometer was configured using the symmetric Bragg-Brentano geometry. Prior to the analysis, a silicon specimen (NIST SRM 640e) was analyzed to verify the observed position of the Si 111 peak is consistent with the NIST-certified position. A specimen of the sample was prepared as a/thin, circular layer centered on a silicon zero-background substrate. Antiscatter slits (SS) were used to minimize the background generated by air. Soller slits for the incident and diffracted beams were used to minimize broadening from axial divergence. Diffraction patterns were collected using a scanning position-sensitive detector (X'Celerator) located 240 mm from the sample and Data Collector software v. 2.2b.

ii. TGA/DSC Combination Analyses

TGA/DSC combination analyses were performed using a Mettler Toledo TGA/DSC3+ analyzer. Temperature and enthalpy adjustments were performed using indium, tin, and zinc, and then verified with indium. Balance was verified with calcium oxalate. The sample was placed in an aluminum pan. The pan was hermetically sealed, the lid pierced, then inserted into the TG furnace. A weighed aluminum pan configured as the sample pan was placed on the reference platform. The furnace was heated under nitrogen.

iii. Differential Scanning Calorimetry

DSC was performed using Mettler-Toledo DSC3+ differential scanning calorimeter. TOPEM® overlays the isothermal or ramped temperature with a time series of random temperature pulses of different durations. A tau lag adjustment is performed with indium, tin, and zinc. The temperature and enthalpy are adjusted with octane, phenyl salicylate, indium, tin and zinc. The adjustment is then verified with octane, phenyl salicylate, indium, tin, and zinc. The sample was placed into a hermetically sealed aluminum DSC pan, and the weight was accurately recorded. The pan lid was pierced then inserted into the DSC cell. A weighed aluminum pan configured as the sample pan was placed on the reference side of the cell. The data was collected from −30° C. to 140° C. with a heating rate of 10° C./minute.

iv. Hot Stage Microscopy (HSM)

Hot stage microscopy was performed using a Linkam hot stage (FTIR 600) mounted on a Leica DM LP microscope equipped with a SPOT Insight™ color digital camera. Temperature calibrations were performed using USP melting point standards. Samples were placed on a cover glass, and a second cover glass was placed on top of the sample. As the stage was heated, each sample was visually observed using a 20× objective, 0.40 NA or 10× objective, 0.22 NA with crossed polarizers and a first order red compensator. Images were captured using SPOT software (v. 4.5.9).

v. Dynamic Vapor Sorption (DVS)

Moisture sorption/desorption data were collected on a Surface Measurement System DVS Intrinsic instrument. Samples were not dried prior to analysis. Sorption and desorption data were collected over a range from 5% to 95% RH at 10% RH increments. The equilibrium criterion used for analysis was less than 0.0100% weight change in 5 minutes with a maximum equilibration time of 3 hours. Data were not corrected for the initial moisture content of the samples.

vi. Infrared Spectroscopy (IR)

The IR spectrum was acquired using a Nicolet 6700 Fourier transform infrared (FT-IR) spectrophotometer (Thermo Nicolet) equipped with an Ever-Glo mid/far IR source, a potassium bromide (KBr) beamsplitter, and a deuterated triglycine sulfate (DTGS) detector. Wavelength verification was performed using NIST SRM 1921b (polystyrene). An attenuated total reflectance (ATR) accessory (Thunderdome™, Thermo Spectra-Tech) equipped with a germanium (Ge) crystal was used for data acquisition. The spectrum represents 256 co-added scans collected at a spectral resolution of 4 $cm^{-1}$. A background data set was acquired with a clean Ge crystal. A Log 1/R (R=reflectance) spectrum was obtained by taking a ratio of these two data sets against each other.

vii. Ion Chromatography

Un-validated IC techniques capable of quantitating multiple anions and multiple cations were used to analyze samples of Compound 1 for sodium content (cation). Sigma-Aldrich Multielement Cation Standard (Cation Part No. 89316, 10.0 mg/kg) were diluted 10-fold with water to a working concentration of 1000 μg/L. The working standard was used to establish system suitability based on scientific judgment.

IC analyses were performed using a Dionex ICS-5000+ series ion chromatograph. The ICS-5000+ consists of two chromatography systems that share an autosampler. The system used for anion detection was equipped with a gradient pump, an eluent generator module, a conductivity detector, and a suppressor (AERS 500 4 mm). A Dionex UTAC-ULP1 5×23 mm concentrator column was installed in place of the sample loop. A Dionex IonPac™ AG19 4×50 mm guard column and a Dionex IonPac™ AS19 4×250 mm analytical column were installed. The system used for cation detection was equipped with an isocratic pump, an eluent generator module, a conductivity detector, and a suppressor (CERS 500 4 mm). A Dionex TCC-UP1 concentrator column was installed in place of a sample loop. A Dionex IonPac™ CG12A-5 μm 3×30 mm guard column and a Dionex IonPac™ CS12A-5 μm 3×150 mm analytical column were installed.

Water (18.2 MΩ, dispensed from ELGA Purelab Flex 2) was used to fill the eluent reservoirs, for standard preparations, and for autosampler flush. DMSO was used for sample preparation and associated blank injections.

viii. Solution Proton Nuclear Magnetic Resonance Spectroscopy ($^1$H NMR)

Solution proton NMR spectra were acquired with an Avance 600 MHz NMR Spectrometer using deuterated DMSO.

ix. Solid State Carbon Nuclear Magnetic Resonance Spectroscopy ($^{13}$C Solid-State NMR)

The solid-state $^{13}$C cross polarization magic angle spinning (CP/MAS) NMR spectrum was acquired on an Agilent DD2-400 spectrometer (Larmor frequencies: $^{13}$C=100.549 MHz, 1H=399.819 MHz). The sample was packed into a 4 mm PENCIL type zirconia and rotated at 12 kHz at the magic angle. The spectrum was acquired at ambient temperature with phase modulated (SPINAL-64) high power 1H decoupling during the acquisition time, a ramped amplitude cross polarization contact time of 5 ms, a 30 ms acquisition time, a 15 second delay between scans, a spectral width of 45 kHz with 2678 data points, and 400 co-added scans. The free induction decay (FID) was processed using Agilent VnmrJ 3.2A software with 2678 points and an exponential line broadening factor of 10 Hz to improve the signal-to-noise ratio. The first three data points of the FID were back predicted using the VNMR linear prediction algorithm to produce a flat baseline. The chemical shifts of the spectral peaks were externally referenced to the carbonyl carbon resonance of glycine at 176.5 ppm.

D. Experiments

Example 1: Preparation of Compound 1 Sodium Form A

Compound 1 (62.3 mg) and sodium benzoate (22.3 mg, 1:1.1, API:Na+, mol/mol) were charged to a 20 mL glass scintillation vial with dioxane (15 mL). The sample was stirred at ambient conditions for 8 days, resulting in a hazy suspension. The suspension was frozen by keeping it at sub-ambient condition at 2-8° C. After 10 days, the sample was allowed to warm to ambient temperature, and was then stirred for an additional day at ambient conditions, resulting in a white suspension that was isolated by vacuum filtration with a nylon membrane filter (0.45 μm pore size). Solids are white powders composed of needles displaying birefringence and extinction under polarized light microscopy.

Example 2a: Preparation of Compound 1 Piperazine Form B

Piperazine (15.8 mg) and acetonitrile (1 mL) were charged to a 2-dram glass vial and the mixture was briefly sonicated into a clear solution. This solution was transferred to a 20 mL glass scintillation vial containing Compound 1 (80.7 mg, 1:1 API:Piperazine, mol/mol). Additional acetonitrile (6 mL) was added to the sample, resulting in a cloudy slurry with white solids. The sample was stirred at ambient conditions for one day, and after that, additional acetonitrile (7 mL) was added and the sample was vortexed for ~2 minutes, and then stirred at ambient conditions for an additional 5 days. The sample was protected from light during the experiments. Solids were isolated by vacuum filtration with a paper filter. Resulting solids are white flakes with aggregates of off-white solids that display birefringence and extinction under polarized light microscopy.

Example 2b: Preparation of Compound 1 Piperazine Form B

Piperazine (69.4 mg) was dissolved in acetonitrile (3 mL) and then added to Compound 1 (82.3 mg, excess piperazine ratio) in a 2-dram vial along with additional acetonitrile (3 mL). The suspension was briefly sonicated and stirred at ambient conditions for 2 days, resulting in a thick white paste. Solids were isolated by vacuum filtration with a nylon membrane filter (0.45 μm pore size) and washed with an arbitrary amount of fresh acetonitrile. Solids are white and display birefringence and extinction under polarize light microscopy.

Example 3a: Preparation of Compound 1 Piperazine Form C

Piperazine (16.3 mg) was dissolved in dichloromethane (2 mL) and the solution was added a 2-dram glass vial containing Compound 1 (77.8 mg, 1:1.1 API:piperazine, mol/mol). After stirring at ambient conditions for ~30 seconds, the sample became a clear solution. Heptane (5 mL) was added to the solution and white solids precipitated. The resulting white suspension was stirred at ambient conditions for 3 days and solids were isolated by vacuum filtration using a nylon membrane filter (0.45 μm pore size), resulting in static white solids that display birefringence and extinction under polarized light microscopy.

Example 3b: Preparation of Compound 1 Piperazine Form C

Piperazine (10.3 mg) was dissolved in dichloromethane (2.5 mL), and the solution was transferred to a 2-dram vial containing Compound 1 (100.6 mg, 2:1.1 API:piperazine, mol/mol), resulting in a clear solution after ~1 minute. The solution was stirred at ambient conditions for ~25 minutes, and heptane (6.5 mL) was added, forming viscous white solids immediately. The sample became a uniform thick white suspension upon shaking, and was stirred for 3 days. The sample was then centrifuged, and liquor was decanted, resulting in wet white solids.

Example 3c: Preparation of Compound 1 Piperazine Form C

Piperazine (9.5 mg) was dissolved in acetone (5 mL). The solution was transferred to a 2-dram glass vial containing Compound 1 (102.5 mg, 2:1 API:piperazine, mol/mol) and the sample was stirred at ambient conditions for 24 days. The resulting thick white suspension was centrifuged, and liquor was decanted from the sample, resulting in white solids.

Example 4: Preparation of Compound 1 Piperazine Form D

Compound 1 Piperazine Form D was generated from Piperazine Form B by drying the solids in a vacuum oven at room temperature for 1 day.

Example 5: Preparation of Compound 1 Piperazine Form E

Piperazine (67.9 mg) was dissolved in dichloromethane (3 mL), and the solution was transferred to a 20 ml glass scintillation vial containing TPP399 (80.0 mg, excess piperazine ratio). A clear solution was immediately obtained, in which heptane (7.5 ml) was added, generating a milky white suspension. The suspension was stirred at ambient conditions for 2 days. Solids were isolated by vacuum filtration with a nylon membrane filter (0.45 μm pore size) and washed with an arbitrary amount of acetonitrile, resulting in white powders that display birefringence and extinction under polarized light microscopy.

Example 6: Preparation of Compound 1 Hydrochloride Form F

TABLE 12

| Guest (b) | Solvent | Conditions (a) | Observation | XRPD Results |
|---|---|---|---|---|
| HCl (1:1) | DCM | 1) API suspended in DCM 2) acid added, briefly stirred, RT 3) heptane added, stirred, RT, 1 d | 1) cloudy 2) solution quickly became clear 3) initial clear solution, cloudy white suspension after stirring, white solids, agg, UM | Compound 1 Crystalline Free Base |
| | THF | 1) API suspended in THF 2) acid added, 3) heptane added, stirred, RT, 7 d | 1) suspension 2) clear solution 3) slow ppt, white powder, fine particles, B/E, UM | HCl Form F |

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention.

What is claimed is:

1. A crystalline form of the sodium salt, piperazine salt, or hydrochloride salt of {2-[3-cyclohexyl-3-(trans-4-propoxy-cyclohexyl)-ureido]-thiazol-5-ylsulfanyl}-acetic acid, wherein:

(a) the sodium salt of {2-[3-cyclohexyl-3-(trans-4-propoxy-cyclohexyl)-ureido]-thiazol-5-ylsulfanyl}-acetic acid salt is characterized as having an X-ray powder diffraction (XRPD) pattern with peaks at the following diffraction angles 4.4±0.2, 9.4±0.2, and 20.0±0.2 degrees two theta as measured using Cu, Kα radiation (Form A);

(b) the piperazine salt of {2-[3-cyclohexyl-3-(trans-4-propoxy-cyclohexyl)-ureido]-thiazol-5-ylsulfanyl}-acetic acid salt is characterized as having an XRPD pattern comprising peaks at the following diffraction angles 4.9±0.2, 12.5±0.2, and 14.9±0.2 degrees two theta as measured using Cu, Kα radiation (Form B);

(c) the piperazine salt of {2-[3-cyclohexyl-3-(trans-4-propoxy-cyclohexyl)-ureido]-thiazol-5-ylsulfanyl}-acetic acid salt is characterized as having an XRPD pattern comprising peaks at the following diffraction angles 5.1±0.2, 13.6±0.2, and 20.5±0.2 degrees two theta as measured using Cu, Kα radiation (Form C) of Formula (I);

(d) the piperazine salt of {2-[3-cyclohexyl-3-(trans-4-propoxy-cyclohexyl)-ureido]-thiazol-5-ylsulfanyl}-acetic acid salt is characterized as having an XRPD pattern comprising peaks at the following diffraction angles 5.5±0.2, 16.7±0.2, and 19.9±0.2 degrees two theta as measured using Cu, Kα radiation (Form D) of Formula (I);

(e) the piperazine salt of {2-[3-cyclohexyl-3-(trans-4-propoxy-cyclohexyl)-ureido]-thiazol-5-ylsulfanyl}-acetic acid salt is characterized as having an XRPD pattern comprising peaks at the following diffraction angles 4.9±0.2, 12.5±0.2, and 18.3±0.2 degrees two theta as measured using Cu, Kα radiation (Form E); or (f) the hydrochloride salt of {2-[3-cyclohexyl-3-(trans-4-propoxy-cyclohexyl)-ureido]-thiazol-5-ylsulfanyl}-acetic acid salt is characterized as having an XRPD pattern comprising peaks at the following diffraction angles 4.6±0.2, 7.2°±0.2, and 17.7°±0.2 degrees two theta as measured using Cu, Kα radiation (Form F).

2. The crystalline form of the sodium salt of claim 1 that is characterized as having an X-ray powder diffraction (XRPD) pattern with peaks at the following diffraction angles 4.4±0.2, 9.4±0.2, and 20.0±0.2 degrees two theta as measured using Cu, Kα radiation (Form A).

3. The crystalline form of the sodium salt of claim 2 that is further characterized as having an endothermic peak with onset at 216° C.±2° C., as determined by DSC; or an IR pattern having peaks at 1358.3±2.0, 1606.1±2.0, and 1649.0±2.0 cm$^{-1}$.

4. The crystalline form of the piperazine salt of claim 1 that is characterized as having an XRPD pattern comprising peaks at the following diffraction angles 4.9±0.2, 12.5±0.2, and 14.9±0.2 degrees two theta as measured using Cu, Kα radiation (Form B).

5. The crystalline form of the piperazine salt of claim 4 that is further characterized as having an endothermic peak with onset at 226° C.±2° C., as determined by DSC.

6. The crystalline form of the piperazine salt of claim 1 that is characterized as having an XRPD pattern comprising peaks at the following diffraction angles 5.1±0.2, 13.6±0.2, and 20.5±0.2 degrees two theta as measured using Cu, Kα radiation (Form C).

7. The crystalline form of the piperazine salt of claim 6 that is further characterized as having an endothermic peak with onset at 214° C.±2° C., as determined by DSC.

8. The crystalline form of the piperazine salt of claim 1 that is characterized as having an XRPD pattern comprising peaks at the following diffraction angles 5.5±0.2, 16.7±0.2, and 19.9±0.2 degrees two theta as measured using Cu, Kα radiation (Form D).

9. The crystalline form of the piperazine salt of claim 1 that is characterized as having an XRPD pattern comprising peaks at the following diffraction angles 4.9±0.2, 12.5±0.2, and 18.3±0.2 degrees two theta as measured using Cu, Kα radiation (Form E).

10. The crystalline form of the piperazine salt of claim 9 that is further characterized as having an endothermic peak with onset at 221° C.±2° C., as determined by DSC.

11. The crystalline form of the hydrochloride salt of claim 1 that is characterized as having an XRPD pattern comprising peaks at the following diffraction angles 4.6±0.2, 7.2°±0.2, and 17.7°±0.2 degrees two theta as measured using Cu, Kα radiation (Form F).

12. The crystalline form of the hydrochloride salt of claim 11 that is further characterized as having an IR pattern having peaks at 1119.0±2.0, 1540.2±2.0, and 1667.5±2.0 cm$^{-1}$.

13. A crystalline form of the sodium salt, piperazine salt, or hydrochloride salt of {2-[3-cyclohexyl-3-(trans-4-propoxy-cyclohexyl)-ureido]-thiazol-5-ylsulfanyl}-acetic acid, wherein:

(a) the sodium salt of {2-[3-cyclohexyl-3-(trans-4-propoxy-cyclohexyl)-ureido]-thiazol-5-ylsulfanyl}-acetic acid salt is characterized as having an X-ray powder diffraction (XRPD) pattern substantially the same as shown in FIG. 1 as measured using Cu, Kα radiation (Form A);

(b) the piperazine salt of {2-[3-cyclohexyl-3-(trans-4-propoxy-cyclohexyl)-ureido]-thiazol-5-ylsulfanyl}-acetic acid salt is characterized as having an XRPD pattern substantially the same as shown in FIG. 5 as measured using Cu, Kα radiation (Form B);

(c) the piperazine salt of {2-[3-cyclohexyl-3-(trans-4-propoxy-cyclohexyl)-ureido]-thiazol-5-ylsulfanyl}-acetic acid salt is characterized as having an XRPD pattern substantially the same as shown in FIG. 9 as measured using Cu, Kα radiation (Form C) of Formula (I);

(d) the piperazine salt of {2-[3-cyclohexyl-3-(trans-4-propoxy-cyclohexyl)-ureido]-thiazol-5-ylsulfanyl}-acetic acid salt is characterized as having an XRPD pattern substantially the same as shown in FIG. 12 as measured using Cu, Kα radiation (Form D) of Formula (I);

(e) the piperazine salt of {2-[3-cyclohexyl-3-(trans-4-propoxy-cyclohexyl)-ureido]-thiazol-5-ylsulfanyl}-acetic acid salt is characterized as having an XRPD pattern substantially the same as shown in FIG. 13 as measured using Cu, Kα radiation (Form E); or (f) the hydrochloride salt of {2-[3-cyclohexyl-3-(trans-4-propoxy-cyclohexyl)-ureido]-thiazol-5-ylsulfanyl}-acetic acid salt is characterized as having an XRPD pattern substantially the same as shown in FIG. 16 as measured using Cu, Kα radiation (Form F).

14. The crystalline form of the sodium salt of claim 13 that is characterized as having an (XRPD pattern substantially the same as shown in FIG. 1 as measured using Cu, Kα radiation (Form A).

15. The crystalline form of the sodium salt of claim 14 that is further characterized as having an a TGA profile substantially the same as shown in FIG. 2; or a DSC profile substantially the same as shown in FIG. 3; or an IR pattern substantially the same as shown in FIG. 4.

16. The crystalline form of the piperazine salt of claim 13 that is characterized as having an XRPD pattern substantially the same as shown in FIG. as measured using Cu, Kα radiation (Form B).

17. The crystalline form of the piperazine salt of claim 4 that is further characterized as having an a TGA profile substantially the same as shown in FIG. 6; or a DSC profile substantially the same as shown in FIG. 7; or a $^{13}$C NMR substantially the same as shown in FIG. 8.

18. The crystalline form of the piperazine salt of claim 13 that is characterized as having an XRPD pattern substantially the same as shown in FIG. 9 as measured using Cu, Kα radiation (Form C).

19. The crystalline form of the piperazine salt of claim 18 that is further characterized as having a TGA profile substantially the same as shown in FIG. 10; or a DSC profile substantially the same as shown in FIG. 11.

20. The crystalline form of the piperazine salt of claim 13 that is characterized as having an XRPD pattern substantially the same as shown in FIG. 12 as measured using Cu, Kα radiation (Form D).

21. The crystalline form of the piperazine salt of claim 13 that is characterized as having an XRPD pattern substantially the same as shown in FIG. 13 as measured using Cu, Kα radiation (Form E).

22. The crystalline form of the piperazine salt of claim 21 that is further characterized as having a TGA profile substantially the same as shown in FIG. 14; or a DSC profile substantially the same as shown in FIG. 15.

23. The crystalline form of the hydrochloride salt of claim 13 that is characterized as having an XRPD pattern substantially the same as shown in FIG. 16 as measured using Cu, Kα radiation (Form F).

24. The crystalline form of the hydrochloride salt of claim 23 that is further characterized as having
   a TGA profile substantially the same as shown in FIG. 17; or
   a DSC profile substantially the same as shown in FIG. 18; or
   an IR pattern substantially the same as shown in FIG. 19.

25. A pharmaceutical composition comprising the crystalline form of claim 1 and a pharmaceutically acceptable carrier, diluent, or excipient, or a mixture thereof.

26. A pharmaceutical composition comprising the crystalline form of claim 13 and a pharmaceutically acceptable carrier, diluent, or excipient, or a mixture thereof.

27. A method of treating a type of diabetes mellitus type 1 or type 2 in a patient in need thereof, where the method comprises administering to the patient the pharmaceutical composition of claim 25.

28. A method of treating a type of diabetes mellitus type 1 or type 2 in a patient in need thereof, where the method comprises administering to the patient the pharmaceutical composition of claim 26.

* * * * *